(12) United States Patent
Saito

(10) Patent No.: US 12,457,414 B2
(45) Date of Patent: Oct. 28, 2025

(54) LENS CONTROL DEVICE, LENS SYSTEM, AND PROGRAM FOR CONTROLLING A LENS TO IMAGE A SUBJECT BASED ON A DISTANCE BETWEEN THE LENS AND SUBJECT

(71) Applicant: Tamron Co., Ltd., Saitama (JP)

(72) Inventor: Tomoharu Saito, Saitama (JP)

(73) Assignee: TAMRON CO., LTD., Saitama (JP)

( * ) Notice: Subject to any disclaimer, the term of this patent is extended or adjusted under 35 U.S.C. 154(b) by 115 days.

(21) Appl. No.: 18/387,253

(22) Filed: Nov. 6, 2023

(65) Prior Publication Data

US 2024/0187728 A1 Jun. 6, 2024

(30) Foreign Application Priority Data

Dec. 2, 2022 (JP) .................................. 2022-193769

(51) Int. Cl.
*H04N 23/66* (2023.01)

(52) U.S. Cl.
CPC .................................. *H04N 23/66* (2023.01)

(58) Field of Classification Search
CPC ......... H04N 23/66; H04N 23/69; G03B 13/20
See application file for complete search history.

(56) References Cited

U.S. PATENT DOCUMENTS

| | | | |
|---|---|---|---|
| 5,715,480 A * | 2/1998 | Nonaka | G03B 17/38 396/271 |
| 2005/0052563 A1 * | 3/2005 | Yasuda | H04N 23/673 348/E5.045 |
| 2010/0066889 A1 * | 3/2010 | Ueda | G03B 19/12 348/E5.022 |
| 2010/0066895 A1 * | 3/2010 | Ueda | H04N 23/75 348/E5.037 |
| 2013/0293768 A1 * | 11/2013 | Niyagawa | H04N 23/675 348/346 |
| 2021/0033710 A1 | 2/2021 | Matsumoto et al. | |
| 2021/0360167 A1 | 11/2021 | Uekusa | |
| 2022/0113493 A1 * | 4/2022 | Voss | H04N 23/667 |
| 2022/0151472 A1 * | 5/2022 | Segawa | H04N 23/73 |
| 2025/0106497 A1 * | 3/2025 | Nordquist | H04N 23/661 |

FOREIGN PATENT DOCUMENTS

| | | | |
|---|---|---|---|
| JP | 2021-026236 A | 2/2021 | |
| JP | 2021-180446 A | 11/2021 | |

* cited by examiner

*Primary Examiner* — Chiawei Chen
(74) *Attorney, Agent, or Firm* — Paratus Law Group, PLLC

(57) ABSTRACT

A lens control device according to an aspect of the present invention controls a lens in order to image a subject and includes at least one processor configured to perform a calculation process of calculating a distance between the lens or a camera, to which the lens is attached, and the subject on a basis of a position of the lens or the camera and a position of the subject and a remote control process of remotely controlling the lens on a basis of the distance.

6 Claims, 14 Drawing Sheets

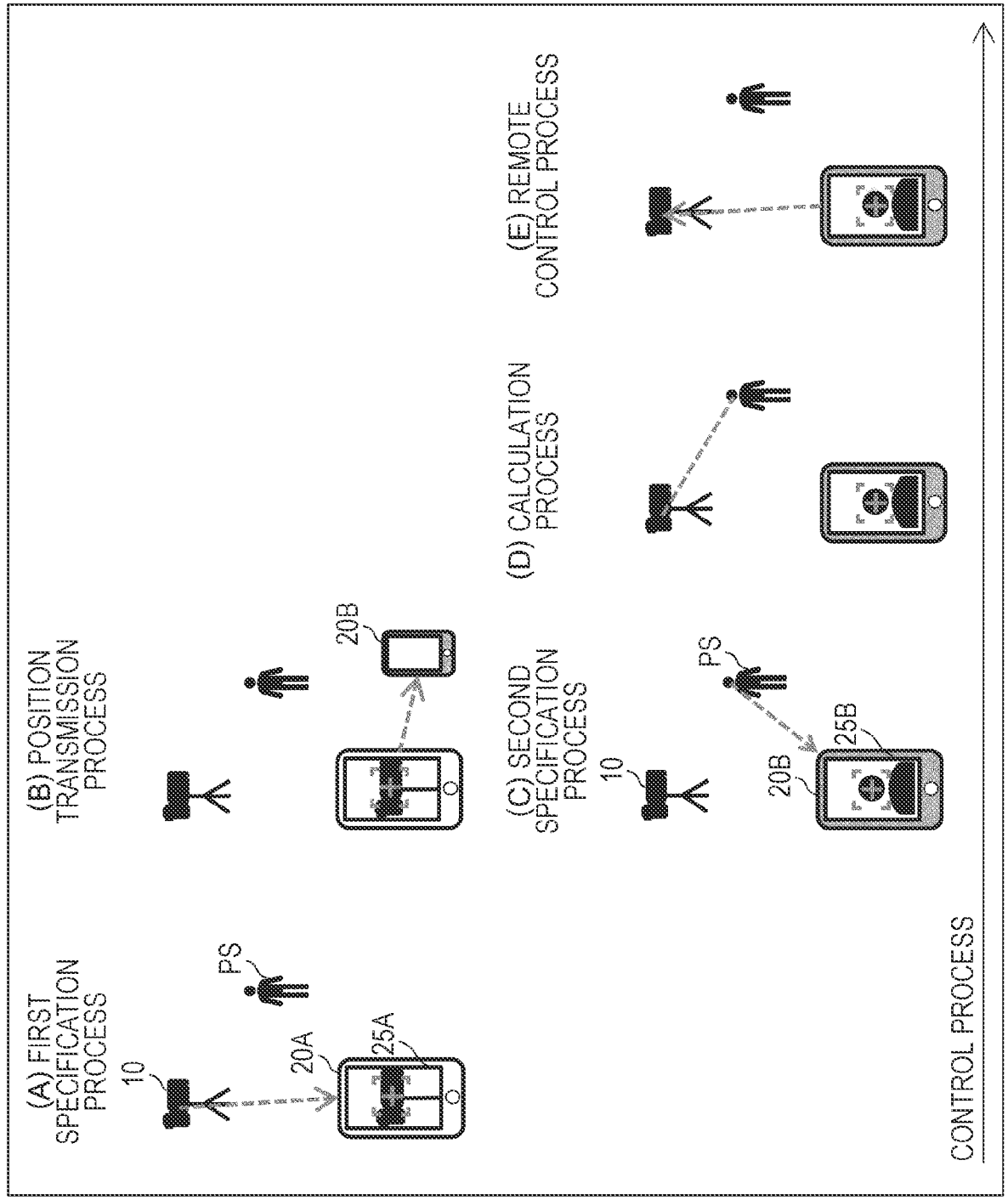

LENS CONTROL DEVICE, LENS SYSTEM, AND PROGRAM FOR CONTROLLING A LENS TO IMAGE A SUBJECT BASED ON A DISTANCE BETWEEN THE LENS AND SUBJECT

CROSS-REFERENCE TO RELATED APPLICATIONS

This application is based on and claims the benefit of priority from Japanese Patent Application No. 2022-193769, filed on Dec. 2, 2022, the entire contents of which are incorporated herein by reference.

BACKGROUND OF THE INVENTION

Technical Field

The present invention relates to a lens control device, a lens system, and a program.

Related Art

With the spread of video posting services, such as TikTok (registered trademark) and YouTube (registered trademark), there is an increasing need for a video imaging technique using a camera, such as a mirrorless camera, and a technique for controlling a lens attached to the camera.

An example of the technique for controlling the lens is an autofocus (AF) technique that uses a focus area or detects a pupil of a subject. These AF techniques have problems such as focus hunting between a plurality of subjects and camera shake resulting from an operation of the user for selecting a focus area or a subject.

As a technique for solving these problems, for example, JP 2021-180446 A discloses an imaging control device that includes a display control means for displaying a captured image on a display means and a detection means for detecting a viewpoint area, which is an area viewed by a user, on the display means and that controls the focus of an imaging means such that the imaging means focuses on the subject displayed in the viewpoint area. Further, JP 2021-026236 A discloses a distance detection device that includes a light emitting means for emitting irradiation light, a light receiving means for receiving reflected light of the irradiation light, an acquisition means for acquiring distance information indicating a distance to an object on the basis of the time from the emission of the irradiation light by the light emitting means to the reception of the reflected light by the light receiving means, and a communication means for communication of the distance information. The distance detection device is attached to a lens device, which is provided in an imaging device, at a position surrounding the lens device.

However, the technique disclosed in JP 2021-180446 A has a problem that the user is not able to select a subject and to control the focus unless the user visually sees a live view in which a captured video is displayed. In addition, the technique disclosed in JP 2021-026236 A has a problem that flexibility in the composition of the captured image is low because the subject needs to be placed at a position detected by the distance detection device. As described above, there is room for improvement in the technique for controlling the lens depending on the purpose and environment of imaging.

An object of an aspect of the present invention is to achieve a novel lens control device that can control a lens while reducing or avoiding camera shake and techniques related to the lens control device.

SUMMARY OF THE INVENTION

In order to achieve the object, according to an aspect of the present invention, there is provided a lens control device for controlling a lens in order to image a subject. The lens control device includes at least one processor configured to perform a calculation process of calculating a distance between the lens or a camera, to which the lens is attached, and the subject on the basis of a position of the lens or the camera and a position of the subject and a remote control process of remotely controlling the lens on the basis of the distance.

In addition, according to another aspect of the present invention, there is provided a lens system for controlling a lens in order to image a subject. The lens system includes the lens and at least one lens control device. The at least one lens control device includes at least one processor configured to perform a calculation process of calculating a distance between the lens or a camera, to which the lens is attached, and the subject on the basis of a position of the lens or the camera and a position of the subject and a remote control process of remotely controlling the lens on the basis of the distance.

The lens control device according to the aspect of the present invention may be implemented by a computer. For example, a lens control device control program that causes a computer to operate as each unit (software element) included in the lens control device and to implement functions of the lens control device is also included in the scope of the present invention. In addition, a computer-readable recording medium having the program recorded thereon is also included in the scope of the present invention.

According to an aspect of the present invention, it is possible to achieve a novel lens control device that can control a lens while reducing or avoiding camera shake and techniques related to the lens control device.

BRIEF DESCRIPTION OF THE DRAWINGS

FIG. 5A illustrates GUIs displayed on the touch display before the first specification process, FIG. 5B illustrates GUIs displayed on the touch display after the first specification process in a case in which a current mode is a first mode, and FIG. 5C illustrates GUIs displayed on the touch display after the first specification process in a case in which the current mode is a second mode;

FIG. 7A is a front view, and FIG. 7B is a side view;

FIG. 11 is a conceptual diagram illustrating an outline of the control processes performed by the processors of the first lens control device and the second lens control device illustrated in FIG. 8;

FIG. 12A illustrates GUIs displayed on the touch display of the first lens control device, FIG. 12B illustrates GUIs displayed on the touch display of the second lens control device in a case in which the current mode is the first mode, and FIG. 12C illustrates GUIs displayed on the touch display of the second lens control device in a case in which the current mode is the second mode;

DESCRIPTION OF THE EMBODIMENTS

First Embodiment

Hereinafter, First Embodiment, which is an embodiment of the present invention, will be described in detail.
(Lens System)

Figure 1:
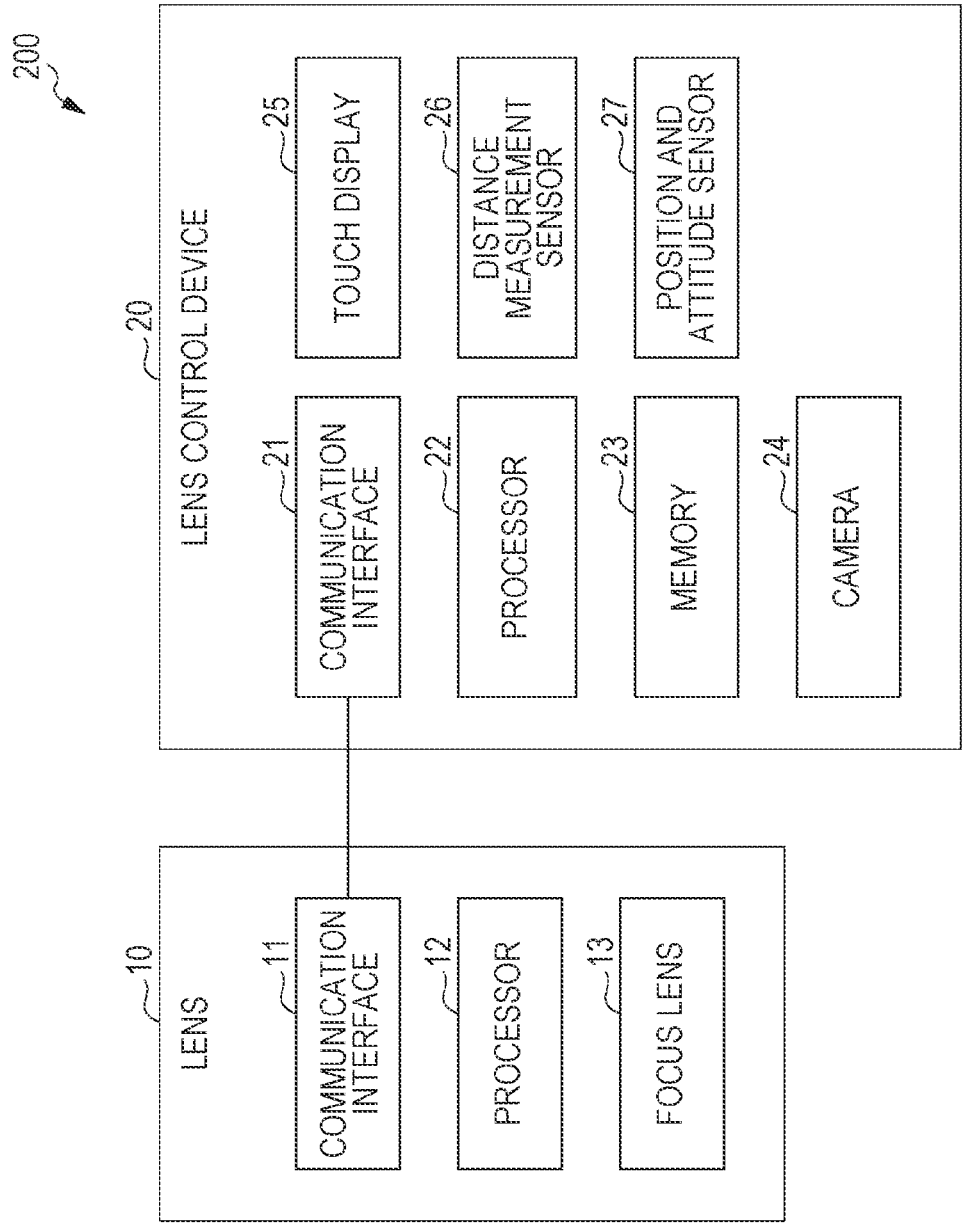
FIG. 1 is a block diagram illustrating a configuration of a lens system according to First Embodiment of the present invention.

A configuration of a lens system 200 according to First Embodiment of the present invention will be described with reference to FIG. 1. FIG. 1 is a block diagram illustrating the configuration of the lens system 200 according to First Embodiment of the present invention. The lens system 200 is a system that controls a lens in order to image a subject PS in at least one of the capture of still images and the capture of moving images. Further, in this specification, the term "lens" means a lens unit having at least one single lens and a supporting member that supports the at least one single lens.

As illustrated in FIG. 1, the lens system 200 includes a lens 10 and a lens control device 20. The lens 10 and the lens control device 20 are connected such that they can communicate with each other through a communication means. In this embodiment, the lens 10 and the lens control device 20 are connected by Bluetooth (registered trademark) communication, which is wireless communication, through a communication interface 11 included in the lens 10 and a communication interface 21 included in the lens control device 20.

In this embodiment, Bluetooth (registered trademark) communication is used as the communication means for connecting the lens 10 and the lens control device 20. However, the present invention is not limited thereto. The communication means may be any means that can transmit and receive electronic data between the lens 10 and the lens control device 20 and may be either a wired communication means or a wireless communication means. In a case in which the communication means is a wired communication means, a cable used may have a length where the vibration of the lens control device 20 does not substantially propagate to the lens 10.

Further, in this embodiment, the lens 10 and the lens control device 20 are directly connected to each other. However, the present invention is not limited thereto. The lens 10 and the lens control device 20 may be directly connected to each other or may be indirectly connected to each other. Examples of the network that can be interposed between the lens 10 and the lens control device 20 indirectly connected to each other include a wide area network (WAN), a local area network (LAN), and camera mount communication. In an embodiment in which the camera mount communication is used, for example, mount communication is implemented by attaching the lens 10 to a mount of a camera, such as a single lens reflex camera, and connecting the camera and the lens control device 20 such that they can communicate with each other.

In this embodiment, the lens 10 is fixed at a fixed point through a tripod. The lens control device 20 is hand-held by the user, and the position and attitude of the lens control device 20 are changed depending on the motion of the user. The subject PS moves within an angle of view of the lens 10.
(Lens)

The lens 10 is a configuration for forming an image of the subject PS on an image sensor provided in a camera C to which the lens 10 is attached. In this embodiment, an interchangeable lens that is detachably attached to the camera C, such as a single lens reflex camera, is used as the lens 10. As illustrated in FIG. 1, the lens 10 includes a communication interface 11, a processor 12, and a focus lens 13.

In addition, in the present invention, the lens 10 is not limited to an interchangeable lens. The lens 10 may have a configuration for forming the image of the subject PS on the image sensor provided in the camera C. Further, in the present invention, the lens 10 may be an interchangeable lens that is attachable to and detachable from the camera C or may be a lens that is integrally attached to the camera C and is not detachable from the camera C. Examples of the interchangeable lens that is detachably attached to the camera C include a zoom lens and a single focus lens. Examples of the camera C to which the lens 10 is integrally attached include a camera provided in a smart phone or a tablet PC, a compact digital camera, a video camera, a surveillance camera, a far-infrared camera, and a microscope camera.

The communication interface 11 is a configuration for controlling the transmission of various types of data from the lens 10 and the reception of various types of data by the lens 10. In this embodiment, a Bluetooth (registered trademark) communication interface is used as the communication interface 11.

The processor 12 is a configuration for controlling the overall operation of the lens 10. The processor 12 develops and executes a control processing program P10 stored in a memory of the lens 10, receives a command signal from a processor 22 of the lens control device 20, and mainly performs a control process S10 of the lens 10. In this embodiment, a central processing unit (CPU) is used as the processor 12. The control process S10 performed by the processor 12 will be described below while changing the drawings referred to.

The focus lens 13 is a configuration for changing a focus position of the lens 10. In this embodiment, a single lens that can be driven along an optical axis passing through the lens 10 is used as the focus lens 13.

In this embodiment, the member of the lens 10 to be controlled by the lens control device 20 is the focus lens 13. However, the present invention is not limited thereto. The object to be controlled by the lens control device 20 may be any of the member included in the lens 10 and the state of the lens 10 related to imaging. Examples of the member included in the lens 10 as the object to be controlled include a focus lens, a zoom lens, a diaphragm, and a variable neutral density (ND) filter. Further, an example of the state of the lens 10 related to imaging as the object to be controlled is the magnification of digital zoom.

(Lens Control Device)

The lens control device 20 is a configuration for controlling the lens 10 in order to image the subject PS. In this embodiment, a smart phone is used as the lens control device 20. As illustrated in FIG. 1, the lens control device 20 is separated from the lens 10 and includes the communication interface 21, a processor 22, a memory 23, a camera 24, a touch display 25, a distance measurement sensor 26, and a position and attitude sensor 27.

A smart phone is used as the lens control device 20 in this embodiment. However, the present invention is not limited thereto. In the present invention, the lens control device 20 may be any device including the processor 22 that performs a calculation process and a remote control process which will be described below. Examples of the lens control device 20 include a smart phone, a tablet PC, a general-purpose PC, a wearable device, such as a smart watch, and an augmented reality (AR)/virtual reality (VR) headset.

In this embodiment, the lens control device 20 remotely controls the lens 10 such that the lens 10 drives the focus lens 13 to match the focus position of the lens 10 with the position of the subject PS, thereby controlling the lens 10 in order to image the subject PS. However, the present invention is not limited thereto. The lens control device 20 may drive or change any one of the members included in the lens 10 and the state of the lens 10 related to imaging to control the lens 10 in order to image the subject PS.

The communication interface 21 is a configuration for controlling the transmission of various types of data from the lens control device 20 and the reception of various types of data by the lens control device 20. In this embodiment, a Bluetooth (registered trademark) communication interface is used as the communication interface 21.

The processor 22 is a configuration for controlling the overall operation of the lens control device 20. The processor 22 develops and executes a control processing program P20 stored in the memory 23 of the lens control device 20. In this embodiment, a central processing unit (CPU) is used as the processor 22. A control process S20 performed by the processor 22 will be described below while changing the drawings referred to.

The memory 23 is a configuration for storing the position of the lens 10. In this embodiment, the memory 23 includes a primary memory and a secondary memory. The primary memory has a function of storing the position of the lens 10 in a volatile manner. The secondary memory has a function of storing the control processing program P20 in a nonvolatile manner. In this embodiment, a dynamic random access memory (DRAM) is used as the primary memory, and a flash memory is used as the secondary memory.

The camera 24 is a configuration for capturing an image that enables the user to identify an object toward which the distance measurement sensor 26 is pointed. In this embodiment, a rear camera that is provided in a smart phone is used as the camera 24.

The touch display 25 is a configuration that functions as a display unit and an input unit. In this embodiment, a touch display that is provided in a smart phone is used as the touch display 25. The touch display 25 functions as a display unit that displays an image captured by the camera 24 as a live view and also functions as an input unit through which the user inputs an operation to the lens control device 20. In addition, the touch display 25 also has a function of enabling the user to identify the object toward which the camera 24 is pointed. This function will be described below while changing the drawings referred to.

The distance measurement sensor 26 is a configuration for measuring a distance between the lens control device 20 and an object. In this embodiment, the distance measurement sensor 26 is provided in the lens control device 20 so as to be pointed in the same direction as the camera 24 and measures the distance between the object in the direction, that is, the object toward which the distance measurement sensor 26 is pointed and the lens control device 20. In this embodiment, a light detection and ranging (LiDAR) sensor is used as the distance measurement sensor 26.

Further, in this embodiment, the light detection and ranging (LiDAR) sensor is used as the distance measurement sensor 26. However, the present invention is not limited thereto. Any sensor that can measure the distance between the object toward which the distance measurement sensor 26 is pointed and the lens control device 20 can be used as the distance measurement sensor 26. For example, a time-of-flight (ToF) sensor, an ultrasonic distance sensor, a stereo camera, or a millimeter wave sensor may be used.

The position and attitude sensor 27 is a configuration for allowing the lens control device 20 to measure the position and orientation of the lens control device 20. In this embodiment, a combination of an acceleration sensor and a gyro sensor is used as the position and attitude sensor 27. However, the present invention is not limited thereto. Any sensor that enables the lens control device 20 to measure the position and orientation of the lens control device 20 can be used as the position and attitude sensor 27. For example, a geomagnetic sensor or a global positioning system (GPS) may be used.

(Control Process of Lens System)

A control process S200 of the lens system 200 will be described below. The control process S200 is a process of controlling the lens 10 in order to image the subject PS. In this embodiment, the control process S200 includes a control process S10 of the lens 10 and a control process S20 of the lens control device 20. The processor 22 of the lens control device 20 performs the control process S20, and the processor 12 of the lens 10 performs the control process S10 in operative association with the control process S20 to perform the control process S200.

(Control Process of Lens Control Device)

Figure 2:
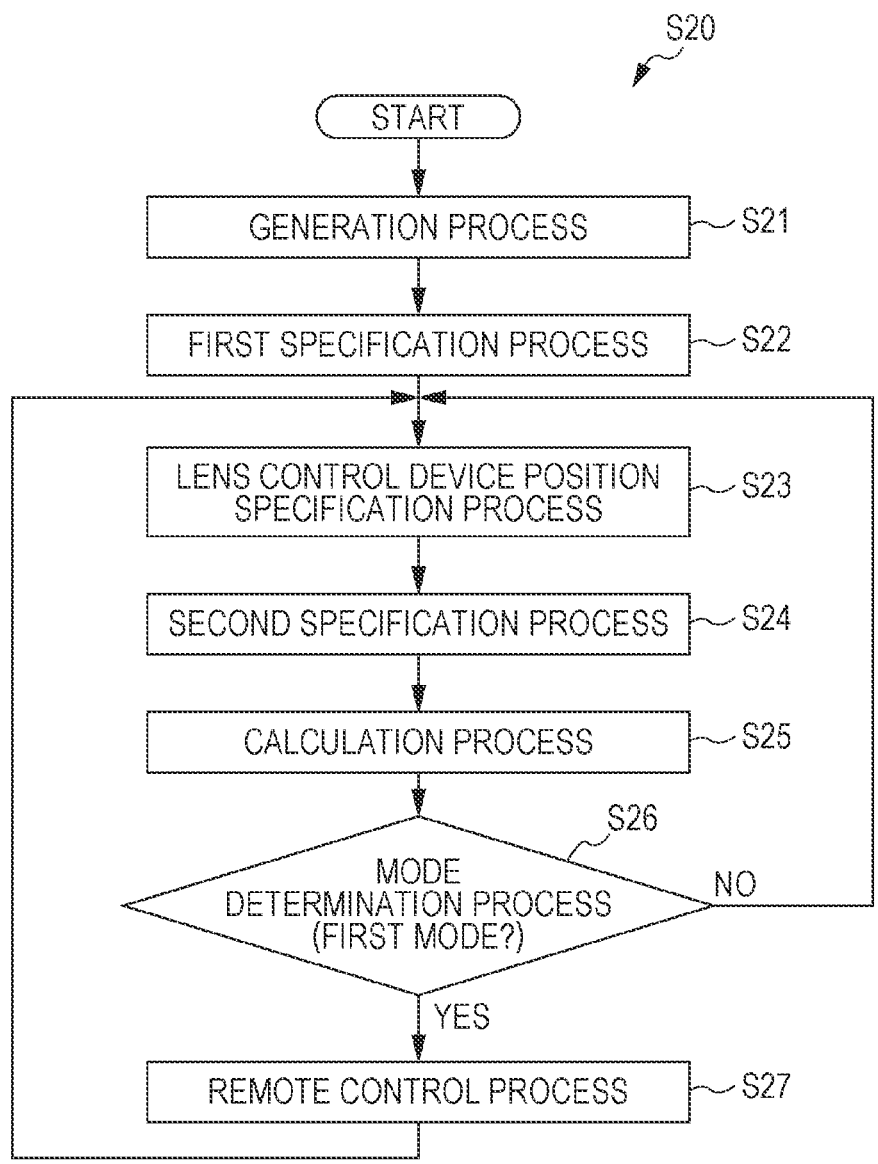
FIG. 2 is a flowchart illustrating a flow of a control process performed by a processor of a lens control device illustrated in FIG. 1.

The control process S20 of the lens control device 20 will be described with reference to FIG. 2. FIG. 2 is a flowchart illustrating a flow of the control process S20 performed by the processor 22 of the lens control device 20 illustrated in FIG. 1. The control process S20 is a process of controlling the lens 10 in order to image the subject PS.

As illustrated in FIG. 2, the control process S20 includes a generation process S21, a first specification process S22, a lens control device position specification process S23, a second specification process S24, a calculation process S25, a mode determination process S26, and a remote control process S27. In this embodiment, these processes are mainly performed by the processor 22 of the lens control device 20.

The processor 22 develops and executes the control processing program P20 to start the control process S20 in response to an input operation of the user. In this embodiment, the control processing program P20 is a program developed using a known AR framework. After starting the control process S20, first, the processor 22 performs the generation process S21. Then, the processor 22 performs the first specification process S22 in response to the input operation of the user and then repeatedly performs the lens control device position specification process S23, the second specification process S24, the calculation process S25, the mode determination process S26, and the remote control process S27. A series of processes repeatedly performed is repeatedly performed at short time intervals, for example, at a cycle of 0.1 seconds. Therefore, it can be considered that the position and attitude of the lens control device 20 are not substantially changed for one cycle of the series of processes, but the position and attitude of the lens control device 20 are changed between the first specification process and the latest one cycle of the series of processes.

(Generation Process)

The generation process S21 is a process of generating a coordinate system. When the user inputs an operation for causing the processor 22 to perform the control process S20 to the touch display 25, the processor 22 develops and executes the control processing program P20 to first perform the generation process S21.

In the generation process S21, the processor 22 generates an XYZ orthogonal world coordinate system as the coordinate system. Here, the processor 22 generates the coordinate system such that the lens control device 20 is located at the origin, the direction in which the camera 24 and the distance measurement sensor 26 are pointed is matched with a negative direction of the Z-axis, and the X-axis, the Y-axis, and the Z-axis are orthogonal to one another.

The generated coordinate system is linked to a real space, and the origin of the coordinate system corresponds to a fixed point in the real space. Therefore, in a case in which the lens control device 20 has been moved in the real space after the generation process, the coordinates of the lens control device 20 in the coordinate system are moved from the origin according to the amount of movement and the movement direction in the real space. In addition, in the present invention, the type of the coordinate system to be generated is not particularly limited. For example, in the generation process S21, the coordinate system may be generated such that the XZ plane is parallel to the ground in the real space recognized by the processor 22 with reference to the image captured by the camera 24, the Y-axis is perpendicular to the ground, and the direction in which the camera 24 and the distance measurement sensor 26 are pointed is parallel to the YZ plane. Further, the coordinate system is not limited to the orthogonal world coordinate system and may be an object coordinate system, a camera coordinate system, or a screen coordinate system.

(First Specification Process)

The first specification process S22 is a process of specifying the position of the lens 10. When the user inputs an operation of causing the processor 22 to perform the first specification process S22 to the touch display 25, the processor 22 specifies the position of the lens 10 and stores the specified position of the lens 10 in the memory 23.

In the first specification process S22, first, the processor 22 specifies the position and attitude of the lens control device 20 in the coordinate system. During the control process S20, the position and attitude of the lens control device 20 are changed depending on the motion of the user holding the lens control device 20. In the first specification process S22, the processor 22 specifies the coordinates and orientation of the lens control device 20, which has been located at the origin of the coordinate system at the time of the generation process S21, at the time of the first specification process S22 with reference to the position and attitude of the lens control device 20 measured by the position and attitude sensor 27.

In the first specification process S22, the processor 22 then detects the object, toward which the distance measurement sensor 26 is pointed, as the lens 10 and specifies the distance between the lens 10 and the lens control device 20. Then, the processor 22 determines the coordinates of the lens 10 in the coordinate system with reference to the coordinate system generated in the generation process S21, the coordinates and orientation of the lens control device 20 specified in the first specification process, and the distance between the lens 10 and the lens control device 20 specified in the first specification process. In this embodiment, the specification of the position of the lens 10 is achieved by determining the coordinates of the lens 10 in the coordinate system.

Then, the processor 22 stores the determined coordinates of the lens 10 in the memory 23.

In this embodiment, the coordinates and orientation of the lens control device 20 in the first specification process S22 are intermittently specified in response to the input operation of the user. However, the present invention is not limited thereto. The coordinates and orientation of the lens control device 20 may be continuously specified by the processor 22, without depending on the input operation of the user, after the generation process S21 and before the first specification process S22. Therefore, the coordinates and orientation of the lens control device 20 may be specified at the time of the start of the first specification process S22.

(Lens Control Device Position Specification Process)

The lens control device position specification process S23 is a process of specifying the position and attitude of the lens control device 20 before the second specification process S24. In the lens control device position specification process S23, the processor 22 specifies the coordinates and orientation of the lens control device 20, which has been located at the origin of the coordinate system at the time of the generation process S21, at the time of the lens control device position specification process S23 with reference to the position and attitude of the lens control device 20 measured by the position and attitude sensor 27.

(Second Specification Process)

The second specification process S24 is a process of specifying the position of the subject PS.

In the second specification process S24, the processor 22 detects the object, toward which the distance measurement sensor 26 is pointed, as the subject PS and specifies the distance between the subject PS and the lens control device 20. Then, the processor 22 determines the coordinates of the subject PS in the coordinate system with reference to the coordinate system generated in the generation process S21, the coordinates and orientation of the lens control device 20 specified in the lens control device position specification process S23, and the distance between the subject PS and the lens control device 20 specified in the second specification process S24. In this embodiment, the specification of the position of the subject PS is achieved by determining the coordinates of the subject PS in the coordinate system.
(Calculation Process)

The calculation process S25 is a process of calculating the distance between the lens 10 and the subject PS on the basis of the position of the lens 10 and the position of the subject PS. In the calculation process S25, the processor 22 calculates the distance between the lens 10 and the subject PS with reference to the coordinates of the lens 10 stored in the memory and the coordinates of the subject PS specified in the second specification process.
(Mode Determination Process)

The mode determination process S26 is a process of determining whether the current mode of the lens control device 20 determined on the basis of the operation input to the touch display 25 by the user is a first mode or a second mode. The memory 23 stores mode information determined by the processor 22 according to the operation input to the touch display 25 by the user at any time. In the mode determination process S26, the processor 22 determines whether the current mode of the lens control device 20 is the first mode or the second mode with reference to the mode information stored in the memory 23.

The first mode is a mode in which the processor 22 performs the remote control process S27 after the calculation process S25. In a case in which the processor 22 determines that the current mode is the first mode (YES), the processor 22 performs the remote control process S27 after performing the mode determination process S26. Therefore, in the first mode, a series of the lens control device position specification process S23, the second specification process S24, the calculation process S25, the mode determination process S26, and the remote control process S27 are continuously performed.

The second mode is a mode in which the processor 22 repeatedly performs the calculation process S25 without performing the remote control process S27 after the calculation process S25. In this embodiment, in a case in which the processor 22 determines that the current mode is the second mode (NO), the processor 22 returns the control process S20 to the lens control device position specification process S23 after performing the mode determination process S26. Therefore, the remote control process S27 is not performed in the second mode. In other words, while the mode of the lens control device 20 is the second mode, the state of the focus lens 13 of the lens 10 is fixed to the state immediately before the mode of the lens control device 20 is switched from the first mode to the second mode.
(Remote Control Process)

The remote control process S27 is a process of remotely controlling the lens 10 on the basis of the distance between the lens 10 and the subject PS calculated in the calculation process S25. In the remote control process S27, the processor 22 transmits information indicating the calculated distance as a command signal to the processor 12 of the lens 10 through the communication interfaces 11 and 22.

In this embodiment, the information indicating the calculated distance is used as the command signal transmitted from the processor 22 to the processor 12. However, the present invention is not limited thereto. Information indicating the position (focus position) or the amount of driving of the single lens in the focus lens 13 for making the calculated distance equal to the focus distance achieved by the focus lens 13 may be used as the command signal.

After performing the remote control process S27, the processor 22 returns the control process S20 to the lens control device position specification process S23.
(Control Process of Lens)

Figure 3:
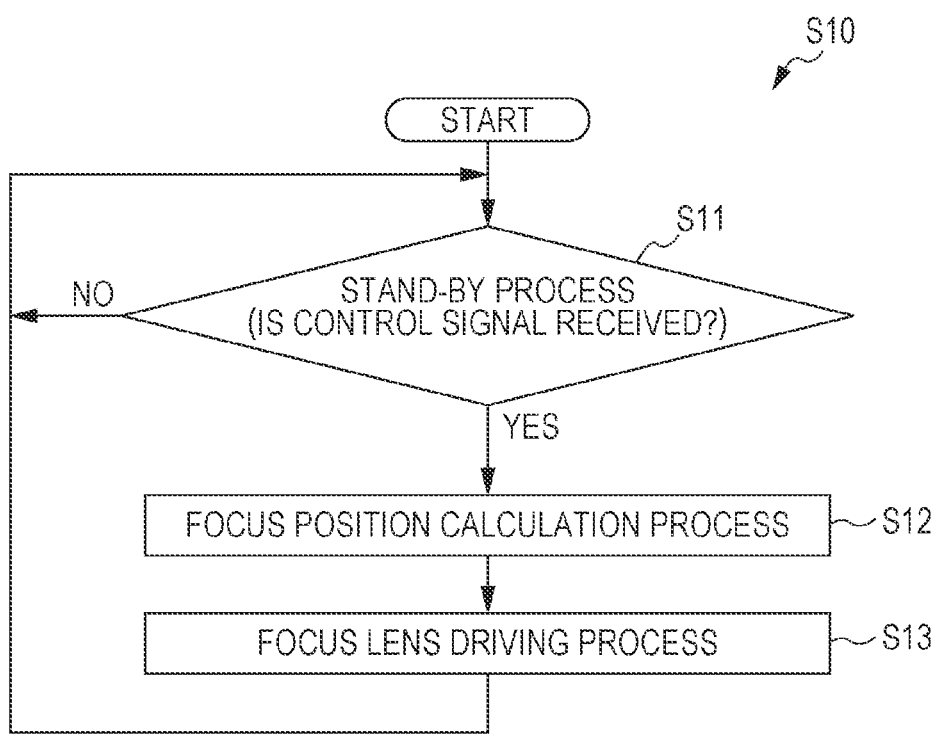
FIG. 3 is a flowchart illustrating a flow of a control process performed by a processor of a lens illustrated in FIG. 1.

The control process S10 of the lens 10 will be described with reference to FIG. 3. FIG. 3 is a flowchart illustrating a flow of the control process S10 performed by the processor 12 of the lens 10 illustrated in FIG. 1. The control process S10 is a process of controlling the lens 10 with reference to the command signal from the lens control device 20.

The control process S10 includes a stand-by process S11, a focus position calculation process S12, and a focus lens driving process S13 as illustrated in FIG. 3. In this embodiment, these processes are mainly performed by the processor 12 of the lens 10.
(Stand-by Process)

The stand-by process S11 is a process of waiting for a command signal from the lens control device 20. In a case in which the processor 12 receives the command signal transmitted by the processor 22 of the lens control device 20 in the remote control process S27 (YES), the processor 12 performs the following focus position calculation process. In a case in which the command signal is not received (NO), the processor 12 repeatedly performs the stand-by process S11.
(Focus Position Calculation Process)

The focus position calculation process S12 is a process of calculating the focus position with reference to the received command signal. In the focus position calculation process S12, with reference to the information indicating the distance which has been received as the command signal and the information indicating the distance from the lens 10 to the image sensor provided in the camera C, the processor 12 calculates the focus position of the focus lens 13 such that the sum of the two distances is equal to the focus distance. Here, the focus distance means the distance from the image sensor provided in the camera C to the focus position of the lens 10, and the focus position means the position of the single lens in the focus lens 13.

In this embodiment, a correspondence relationship between the focus distance and the focus position is defined by the control processing program P10 stored in the memory of the lens 10, and the processor 12 calculates the focus position with reference to the correspondence relationship.
(Focus Lens Driving Process)

The focus lens driving process S13 is a process of driving the focus lens 13. The processor 12 drives the focus lens 13 such that the position of the single lens in the focus lens 13 is matched with the focus position calculated in the focus position calculation process S12.
(Outline of Control Process of Lens Control Device)

Figure 4:
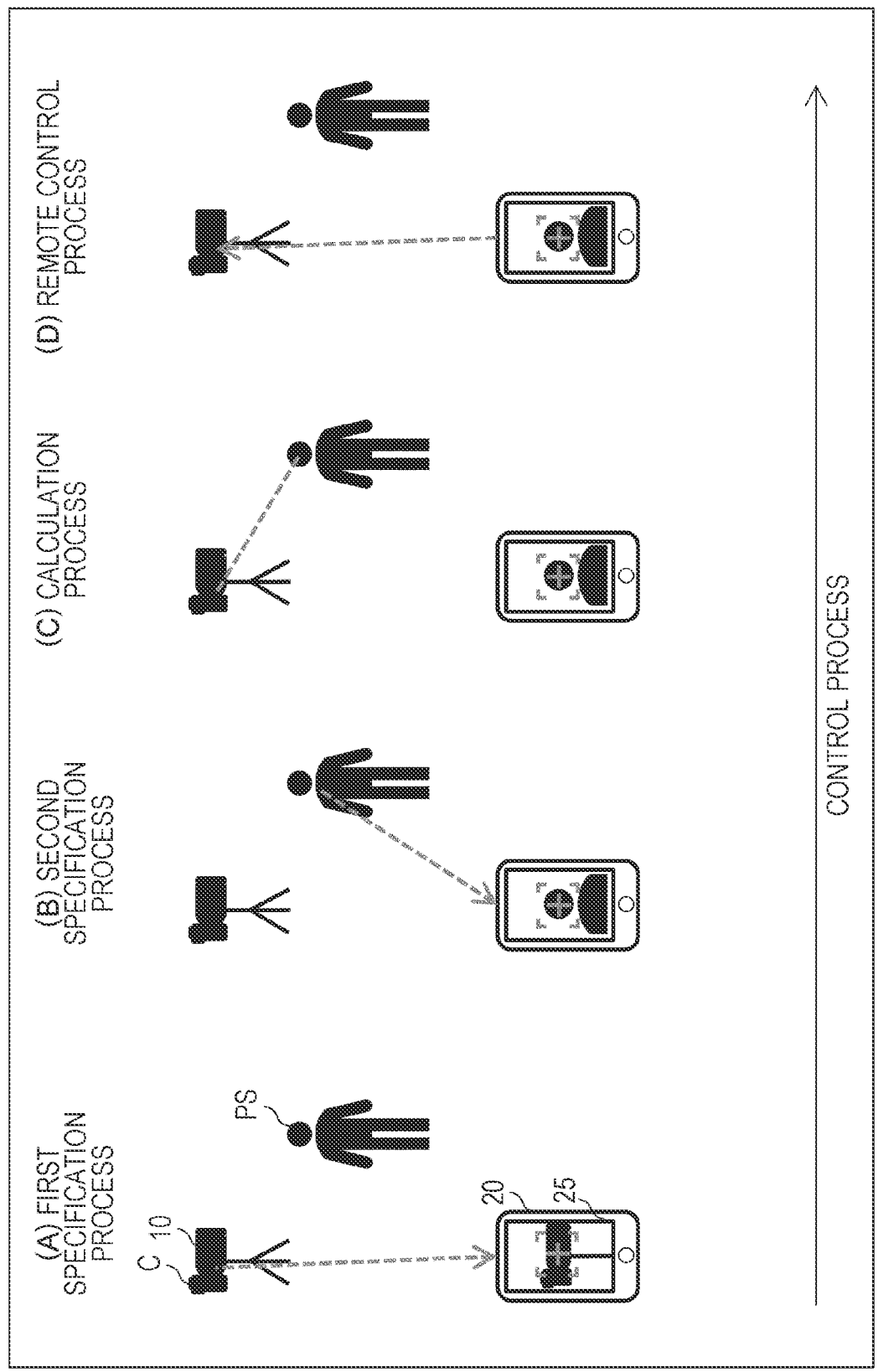
FIG. 4 is a conceptual diagram illustrating an outline of the control process performed by the processor of the lens control device illustrated in FIG. 1, (A) is a conceptual diagram illustrating an outline of a first specification process, (B) is a conceptual diagram illustrating an outline of a second specification process, (C) is a conceptual diagram illustrating an outline of a calculation process, and (D) is a conceptual diagram illustrating an outline of a remote control process.

An outline of the control process S20 of the lens control device 20 will be described with reference to FIG. 4. FIG. 4 is a conceptual diagram illustrating the outline of the control process S20 performed by the processor 22 of the lens control device 20 illustrated in FIG. 1. FIG. 4(A) is a conceptual diagram illustrating an outline of the first specification process S22. FIG. 4(B) is a conceptual diagram illustrating an outline of the second specification process S24. FIG. 4(C) is a conceptual diagram illustrating an outline of the calculation process S25. FIG. 4(D) is a conceptual diagram illustrating an outline of the remote control process S27. In FIG. 4, the lens 10, the lens control device 20, and the subject PS are illustrated, but the user holding the lens control device 20 is not illustrated for simplicity.

First, an outline of an operation performed by the user for the control process S20 will be described. As illustrated in FIG. 4(A), in the first specification process S22, the user inputs an operation corresponding to the first specification process S22 to the touch display 25 while pointing the camera 24 of the lens control device 20 toward the lens 10. After the first specification process S22, the user keeps pointing the camera 24 of the lens control device 20 toward the subject PS as illustrated in FIGS. 4(B), 4(C), and 4(D).

An outline of the process performed by the lens control device 20 in the control process S20 will be described. In the first specification process S22, the lens control device 20 detects an object, toward which the camera 24 and the distance measurement sensor 26 are pointed, as the lens 10 and specifies the position of the lens 10 in response to the operation input to the touch display 25 by the user. After the first specification process S22, in the second specification process S24, the lens control device 20 detects an object, toward which the distance measurement sensor 26 is pointed, as the subject PS and specifies the position of the subject PS. In the calculation process S25, the lens control device 20 calculates the distance between the lens 10 and the subject PS. In the remote control process S27, the lens control device 20 transmits a command signal to the lens 10 to remotely control the lens 10 on the basis of the calculated distance.

As described above, after the first specification process S22, when the user holding the lens control device 20 continues to point the camera 24 toward the object intended as the subject PS, the lens control device 20 can control the lens 10 in order to image the subject PS. In addition, when the user switches the pointing of the camera 24 from the lens 10 to the subject PS between the first specification process S22 and the second specification process S24 and when the user changes the pointing of the camera 24 so as to follow the movement of the subject PS during the second specification process S24, the calculation process S25, and the remote control process S27, the position and attitude of the lens control device are changed. Since this change is specified in the lens control device position specification process S23 and is reflected in the calculation process S25, the user can freely change the position and attitude of the lens control device 20 during the control process S20.

As can be understood from the above, the user can perform a simple and intuitive operation of pointing the camera 24 of the lens control device 20 toward the lens 10 or the subject PS without touching and operating the camera, to which the lens 10 is attached, to adjust the focus position of the lens 10. Therefore, the lens control device 20 enables the user to control the lens while reducing or avoiding camera shake. In addition, since the focus position of the lens 10 is controlled to be matched with the subject toward which the user has pointed the camera 24, focus hunting, which is a problem of an AF technique according to the related art, is avoided.

Further, according to the lens control device 20, even when the subject PS is not included in a focus area in the image captured by the camera to which the lens 10 is attached, it is possible to match the focus position with the subject PS. Therefore, flexibility in imaging composition is improved. Furthermore, according to the lens control device 20, the user can manage imaging without seeing the live view of the camera to which the lens 10 is attached. Therefore, the user does not need to be located near the camera to which the lens 10 is attached. In addition, it is easy to manage imaging. For example, it is also easy for one person to perform imaging.

In addition, it is determined whether or not the remote control process S27 is performed according to the mode of the lens control device 20. Therefore, according to the lens control device 20, it is possible to prevent the focus position from being matched with an object that is not intended as the subject PS included in the image captured by the camera 24 while the subject PS is switched from one object to another object.

(GUI of Lens Control Device)

Figure 5A:
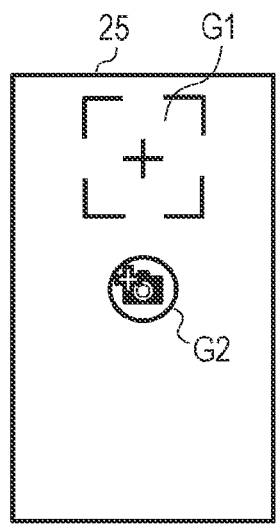
FIGS. 5A to 5C are schematic diagrams illustrating an example of GUIs displayed on a touch display of the lens control device illustrated in FIG. 1.
Figure 5B:
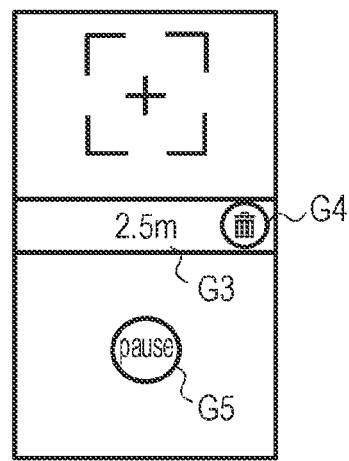
Figure 5C:
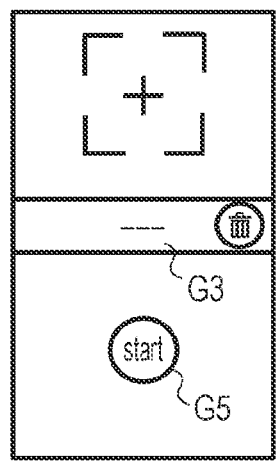

A graphical user interface (GUI) that is displayed on the touch display 25 of the lens control device 20 while the control process S20 of the lens control device 20 is being performed will be described with reference to FIGS. 5A to 5C. FIGS. 5A to 5C are schematic diagrams illustrating an example of GUIs displayed on the touch display 25 of the lens control device 20 illustrated in FIG. 1. FIG. 5A illustrates GUIs displayed on the touch display 25 before the first specification process S22. FIG. 5B illustrates GUIs displayed on the touch display 25 after the first specification process S22 in a case in which the current mode is the first mode. FIG. 5C illustrates GUIs displayed on the touch display 25 after the first specification process S22 in a case in which the current mode is the second mode. The touch display 25 displays the image captured by the camera 24 as a live view in the background of the GUI. However, the illustration of the background is omitted in FIGS. 5A to 5C for simplicity.

As illustrated in FIG. 5A, in the first specification process, the touch display 25 displays a reticle G1 and a lens position registration button G2. The reticle G1 is a GUI that enables the user to identify an object toward which the camera 24 and the distance measurement sensor 26 are pointed and is displayed to be superimposed on the image captured by the camera 24. The lens position registration button G2 is a GUI that is touched by the user to cause the lens control device 20 to perform the first specification process S22. When the lens 10 is displayed to be superimposed on the reticle G1, the user touches the lens position registration button G2 to cause the lens control device 20 to perform the first specification process S22.

As illustrated in FIG. 5B, in a case in which the current mode is the first mode, the touch display 25 displays calculated distance information G3, a lens position deletion button G4, and a mode switching button G5. The calculated distance information G3 is a GUI that displays information indicating the distance between the lens 10 and the subject PS calculated in the calculation process S25. The lens position deletion button G4 is a GUI that is touched by the user to cause the lens control device 20 to delete the information indicating the position of the lens 10 stored in the memory 23 in the first specification process S22. When the user touches the lens position deletion button G4, the lens control device 20 returns the control process S20 to the first specification process S22, and the touch display 25 switches the GUI to be displayed from the GUI illustrated in FIG. 5B to the GUI illustrated in FIG. 5A. The mode switching button G5 is a GUI that is touched by the user to switch the mode. In a case in which the user touches the mode switching button G5 when the current mode is the first mode, the lens control device 20 switches the mode to the second mode, and the touch display 25 switches the GUI to be displayed from the GUI illustrated in FIG. 5B to a GUI illustrated in FIG. 5C.

As illustrated in FIG. 5C, in a case in which the current mode is the second mode, the touch display 25 displays the calculated distance information G3 and the mode switching button G5. In a case in which the current mode is the second mode in which the remote control process S27 is not performed, the calculated distance information G3 is not displayed. In a case in which the user touches the mode switching button G5 when the current mode is the second mode, the lens control device 20 switches the mode to the first mode, and the touch display 25 switches the GUI to be displayed from the GUI illustrated in FIG. 5C to the GUI illustrated in FIG. 5B.

Modification Examples of First Embodiment

In this embodiment, the specification of the position of the lens 10 in the first specification process S22 and the specification of the position of the subject PS in the second specification process S24 are performed with reference to the position and attitude of the lens control device 20 measured by the position and attitude sensor 27 and the distance between the lens 10 or the subject PS and the lens control device 20 measured by the distance measurement sensor 26. However, the present invention is not limited thereto. These processes can be performed by any technique that can detect an object and specify the position and orientation of the object. For example, the processor 22 may detect the object, toward which the camera 24 is pointed, as the lens 10, the camera C to which the lens 10 is attached, or the subject PS and specify the position of the lens 10, the camera C, or the subject PS with reference to the image captured by the camera 24. In this modification example in which the captured image is referred to, a marker-based or marker-less visual-based AR framework can be used. Examples of the modification example in which the visual-based AR framework is used include a modification example in which an AR marker provided in the lens 10 is used and a modification example in which a technique searching for feature points on the face and body of the subject PS (for example, face tracking) is used.

In this embodiment, the processor 22 specifies the position of the lens 10 in the first specification process S22. However, the present invention is not limited thereto. In the first specification process S22, the processor 22 may specify the position of the camera C to which the lens 10 is attached, instead of the position of the lens 10. Here, the position of the camera C includes the position of any member included in the camera C. For example, the processor 22 may specify the position of the image sensor included in the camera C in the first specification process S22, calculate the distance between the image sensor and the subject PS in the calculation process S25, and remotely control the lens 10 with reference to the calculated distance in the remote control process S27.

In this embodiment, the touch display 25 displays the image captured by the camera 24 as a live view. However, the present invention is not limited thereto. In the present invention, the lens control device 20 may receive the image captured by the camera, to which the lens 10 is attached, from the camera and display the captured image as a live view in parallel to the image captured by the camera 24.

Further, in this embodiment, the touch display 25 displays the distance between the lens 10 and the subject PS as the calculated distance information G3. However, the present invention is not limited thereto. In the present invention, the touch display 25 may display the distance between the lens control device 20 and the subject PS calculated by the processor 22, instead of or in addition to the distance between the lens 10 and the subject PS. For example, a format indicating the distance between the lens control device 20 and the subject PS may be a numerical value or may be a virtual object that is displayed as an augmented reality image to be superimposed on the captured image displayed as the live view on the touch display 25. In the modification example in which the virtual object is used, the processor 22 may generate a coordinate system and generate a virtual space corresponding to the coordinate system in the first specification process S22 and may specify the position of the subject PS and dispose a virtual object having a fixed size at the coordinates in the virtual space corresponding to the position in the second specification process S24. The processor 22 may display an augmented reality image including the virtual object and the live view with reference to the coordinates of the lens control device 20 specified in the lens control device position specification process S23 and the coordinates of the virtual object. The user can see the size of the virtual object in the augmented reality image and recognize the distance between the lens control device 20 and the subject PS.

Second Embodiment

Hereinafter, Second Embodiment, which is another embodiment of the present invention, will be described. In addition, for convenience of description, members having the same functions as the members in the above-described embodiment are denoted by the same reference numerals, and description thereof will not be repeated.
(Lens System)

Figure 6:
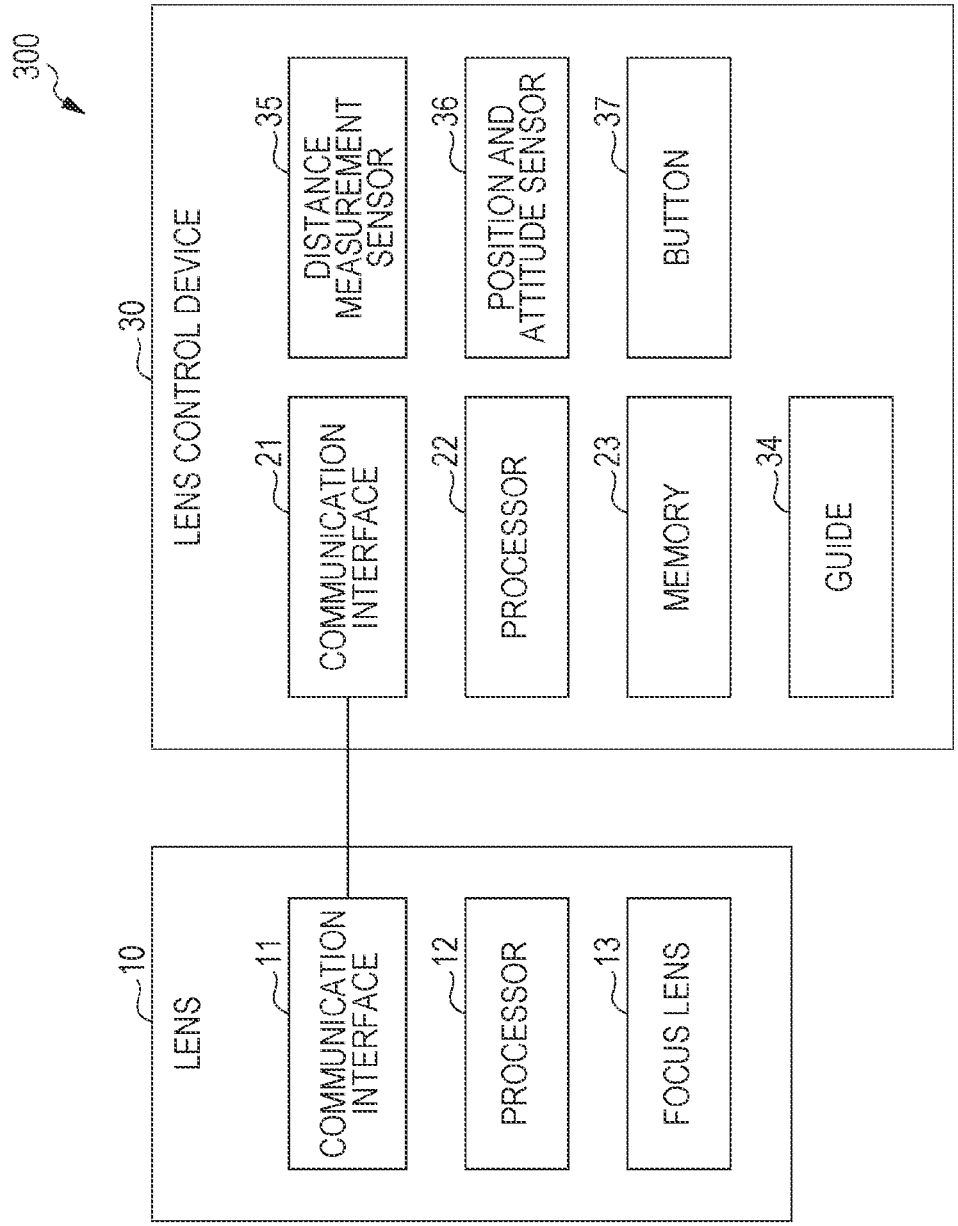
FIG. 6 is a block diagram illustrating a configuration of a lens system according to Second Embodiment of the present invention.

A configuration of a lens system 300 according to Second Embodiment of the present invention will be described with reference to FIG. 6. FIG. 6 is a block diagram illustrating the configuration of the lens system 300 according to Second Embodiment of the present invention.

As illustrated in FIG. 6, the lens system 300 includes the lens 10 and a lens control device 30. The lens 10 and the lens control device 30 are connected such that they can communicate with each other through a communication means.
(Lens Control Device)

The lens control device 30 is a configuration for controlling the lens 10 in order to image the subject PS. In this embodiment, a dedicated remote controller is used as the lens control device 30. The appearance of the remote controller will be described while changing the drawings referred to. As illustrated in FIG. 6, the lens control device 30 is separated from the lens 10 and includes the communication interface 21, the processor 22, the memory 23, a guide 34, a distance measurement sensor 35, a position and attitude sensor 36, and a button 37.

The guide 34 is a configuration that enables the user to identify an object toward which the distance measurement sensor 35 is pointed. In this embodiment, transparent glass having a cross-shaped reticle printed thereon is used as the guide 34. The guide 34 is provided in the lens control device 30 such that, when the user looks at the object through the transparent glass which is the guide 34, the object superimposed on the printed reticle is the object toward which the distance measurement sensor 35 is pointed. Therefore, the guide 34 is a structure that enables the user to identify the object toward which the distance measurement sensor 35 is pointed.

Since the distance measurement sensor 35 and the position and attitude sensor 36 have the same configurations as the distance measurement sensor 26 and position and attitude sensor 27, respectively, the description thereof will not be repeated.

The button 37 is a configuration for the user to input an operation to the lens control device 30. In this embodiment, a physical button that can be pressed is used as the button 37.
(Appearance of Lens Control Device)

Figure 7A:
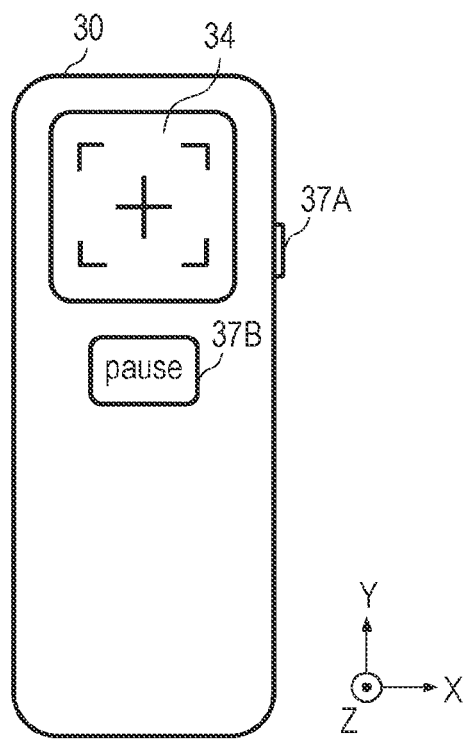
FIGS. 7A and 7B are schematic diagrams illustrating the appearance of a lens control device illustrated in FIG. 6.
Figure 7B:
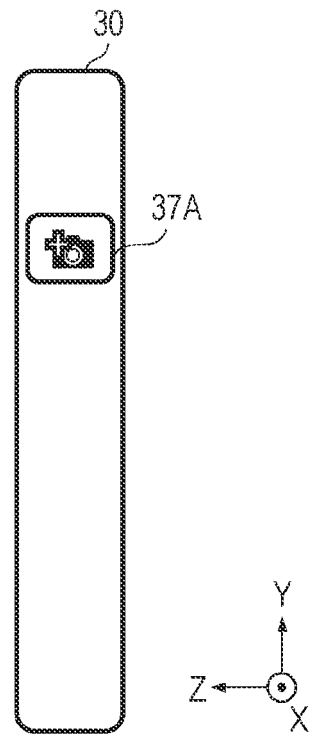

The appearance of the lens control device 30 will be described with reference to FIGS. 7A and 7B. FIGS. 7A and 7B are schematic diagrams illustrating the appearance of the lens control device 30 illustrated in FIG. 6. FIG. 7A is a front view. FIG. 7B is a side view. As illustrated in FIGS. 7A and 7B, the lens control device 30 includes the guide 34 and two buttons 37A and 37B as the button 37. In addition, the communication interface 21, the processor 22, the memory 23, the distance measurement sensor 35, and the position and attitude sensor 36 included in the lens control device 30 are not illustrated in FIGS. 7A and 7B because they are provided in the lens control device 30.

The distance measurement sensor 35 is provided in the lens control device 30 so as to point in the negative direction of the Z-axis. Therefore, when the user looks at the object through the guide 34 in the negative direction of the Z-axis, the user can understand that the object superimposed on the cross-shaped reticle is the object toward which the distance measurement sensor 35 is pointed and is the object to which the distance is to be measured.

The button 37A is an input unit corresponding to the first specification process S22. When the user presses the button 37A, the processor 22 performs the first specification process S22. The button 37B is an input unit for switching the mode. When the user presses the button 37B, the processor 22 switches the mode of the lens control process S20 between the first mode and the second mode determined by the processor 22 in the mode determination process S26.
(Control Process of Lens System)

A control process S300 of the lens system 300 is similar to the control process S200 of the lens system 200. In the control process S200, the processor 22 performs the first specification process S22, the lens control device position specification process S23, and the second specification process S24 through the AR framework on which the control processing program P20 is based. In contrast, in the control process S300, the processor 22 performs these processes with reference to the position and attitude of the lens control device 30 measured by the position and attitude sensor 36 and the distance between the lens 10 or the subject PS and the lens control device 30 measured by the distance measurement sensor 35, without passing through the AR framework. The control process S300 is the same as the control process S200 except for this point. Therefore, the description of each process included in the control process S300 will not be repeated.

Modification Examples of Second Embodiment

In this embodiment, the lens control device 30 including the distance measurement sensor 35 and the position and attitude sensor 36 is the device illustrated in FIGS. 7A and 7B. However, the present invention is not limited thereto. In the present invention, any device including at least one sensor that can measure the position and attitude of the lens control device 30 and the distance between the lens or the subject and the lens control device and at least one processor can be used as the lens control device 30. Smart glass can be given as an example of the lens control device 30.

In addition, in this embodiment, the transparent glass is used as the guide 34. However, the present invention is not limited thereto. The guide 34 may be any member that enables the user to identify the object toward which the distance measurement sensor 35 is pointed. For example, the guide 34 may be a dot-shaped indicator that is projected onto a lens of the smart glass or may be a dot-shaped indicator that is projected onto a retina by a retinal-projection-type laser projector.

Third Embodiment

Hereinafter, Third Embodiment, which is still another embodiment of the present invention, will be described.
(Lens System)

Figure 8:
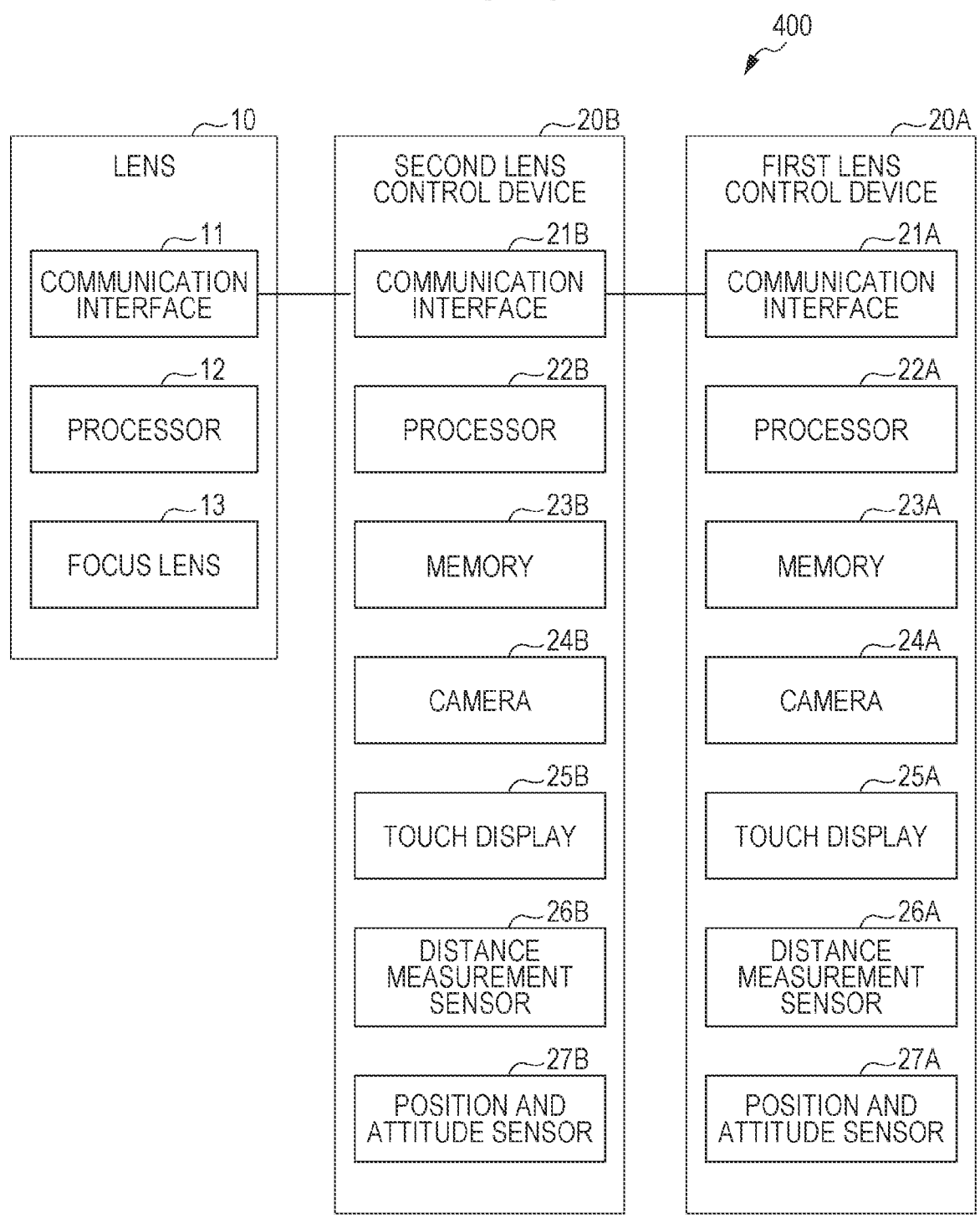
FIG. 8 is a block diagram illustrating a configuration of a lens system according to Third Embodiment of the present invention.

A configuration of a lens system 400 according to Third Embodiment of the present invention will be described with reference to FIG. 8. FIG. 8 is a block diagram illustrating the configuration of the lens system 400 according to Third Embodiment of the present invention.

As illustrated in FIG. 8, the lens system 400 includes the lens 10, a first lens control device 20A, and a second lens control device 20B. The lens 10 and the second lens control device 20B are connected such that they can communicate with each other through Wifi (registered trademark) communication as a communication means, and the second lens control device 20B and the first lens control device 20A are connected such that they can communicate with each other through a communication means.
(Lens Control Device)

The first lens control device 20A is separated from the lens 10 and includes a communication interface 21A, a processor 22A, a memory 23A, a camera 24A, a touch display 25A, a distance measurement sensor 26A, and a position and attitude sensor 27A. The second lens control device 20B is separated from the lens 10 and includes a communication interface 21B, a processor 22B, a memory 23B, a camera 24B, a touch display 25B, a distance measurement sensor 26B, and a position and attitude sensor 27B. Each member included in the first lens control device 20A and the second lens control device 20B has the same functions as each member that is included in the lens control device 20 and described with the same member name. Therefore, the description of each member included in the first lens control device 20A and the second lens control device 20B will not be repeated.

The lens 10, the first lens control device 20A, the second lens control device 20B, and the subject PS are disposed in one room. The lens 10 is hand-held by a cameraman and is moved in the room. The first lens control device 20A is hand-held by a first user, and the position and attitude of the first lens control device 20A are changed depending on the motion of the first user. The second lens control device 20B is hand-held by a second user, and the position and attitude of the second lens control device 20B are changed depending on the motion of the second user. The subject PS moves in the room.
(Control Process of Lens System)

A control process S400 of the lens system 400 will be described below. The control process S400 is a process of controlling the lens 10 in order to image the subject PS. In this embodiment, the control process S400 includes a control process S10 of the lens 10, a control process S40 of the first lens control device 20A, and a control process S50 of the second lens control device 20B. The processor 22A of the first lens control device 20A performs the control process S40, the processor 22B of the second lens control device 20B performs the control process S50, and the processor 12 of the lens 10 performs the control process S10 to perform the control process S400. The control process S40 of the first lens control device 20A and the control process S50 of the second lens control device 20B are performed in parallel by the processor 22A and the processor 22B, respectively.

(Control Process of First Lens Control Device)

Figure 9:
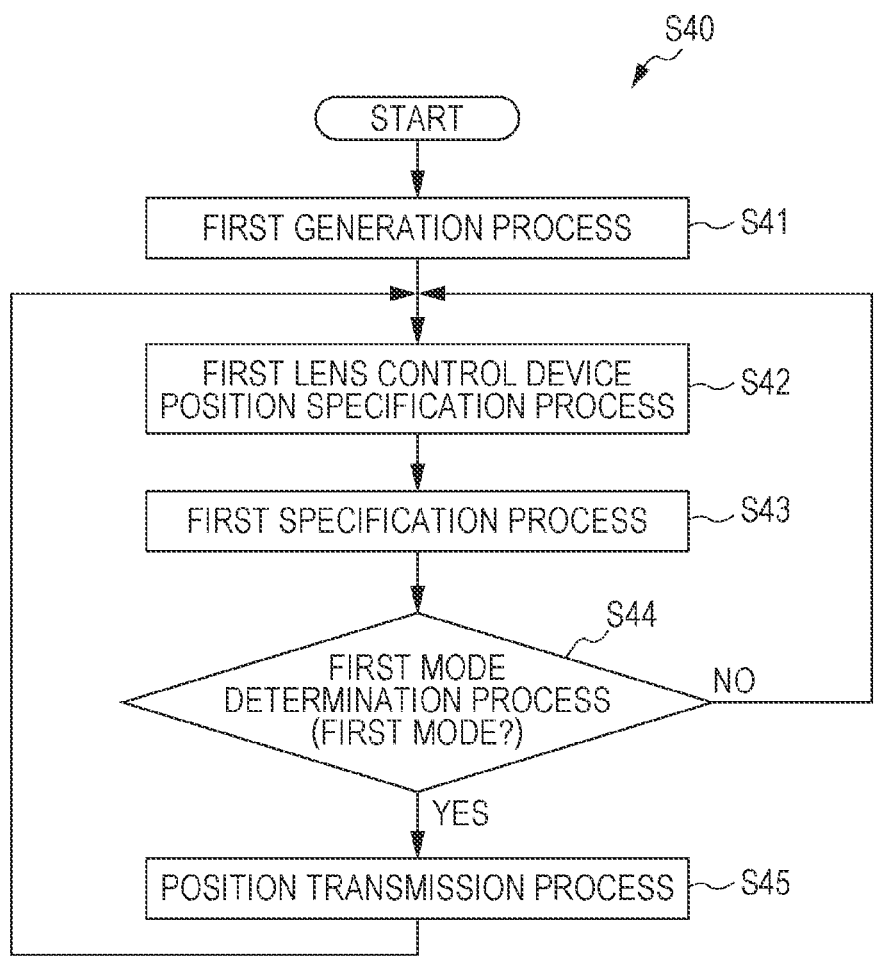
FIG. 9 is a flowchart illustrating a flow of a control process performed by a processor of a first lens control device illustrated in FIG. 8.

The control process S40 of the first lens control device 20A will be described with reference to FIG. 9. FIG. 9 is a flowchart illustrating a flow of the control process S40 performed by the processor 22A of the first lens control device 20A illustrated in FIG. 8. The control process S40 is a process of specifying the position of the lens 10 in order to image the subject PS and transmitting the position to the second lens control device 20B.

As illustrated in FIG. 9, the control process S40 includes a first generation process S41, a first lens control device position specification process S42, a first specification process S43, a first mode determination process S44, and a position transmission process S45. In this embodiment, these processes are mainly performed by the processor 22A of the first lens control device 20A.

The processor 22A starts the control process S40 in response to an input operation of the first user and first performs the first generation process S41. Then, after performing the first generation process S41, the processor 22A repeatedly performs the first lens control device position specification process S42, the first specification process S43, the first mode determination process S44, and the position transmission process S45.

(First Generation Process)

The first generation process S41 is a process of generating a coordinate system. When the first user inputs an operation for causing the processor 22A to perform the first generation process S41 to the touch display 25A, the processor 22A performs the first generation process S41. For simplicity, hereinafter, the coordinate system generated in the first generation process S41 is referred to as a first coordinate system, and the coordinate system generated in a second generation process S51, which will be described below, is referred to as a second coordinate system.

In the first generation process S41, first, the processor 22A specifies the position of a first object toward which the distance measurement sensor 26A is pointed. Then, the processor 22A specifies the position of a second object which is different from the first object and toward which the distance measurement sensor 26A is pointed by a change of the orientation of the first lens control device 20A by the first user. Then, the processor 22A generates the first coordinate system as the XYZ orthogonal world coordinate system. Here, the processor 22A generates the first coordinate system with reference to the specified positions of the first object and the second object such that the first object is located at the origin and the second object is aligned in the negative direction of the Z-axis.

(First Lens Control Device Position Specification Process)

The first lens control device position specification process S42 is a process of specifying the position and attitude of the first lens control device 20A before the first specification process S43. Since the first lens control device position specification process S42 is the same as the lens control device position specification process S23, the description thereof will not be repeated.

(First Specification Process)

The first specification process S43 is a process of specifying the position of the lens 10. In the first specification process S43, the processor 22A detects the object, toward which the distance measurement sensor 26A is pointed, as the lens 10 and specifies the distance between the lens 10 and the first lens control device 20A. Then, the processor 22A determines the coordinates of the lens 10 in the first coordinate system with reference to the first coordinate system generated in the first generation process S41, the position and orientation of the first lens control device 20A specified in the first lens control device position specification process S42, and the distance between the lens 10 and the first lens control device 20A specified in the first specification process S43.

(First Mode Determination Process)

The first mode determination process S44 is a process of determining whether the current mode of the first lens control device 20A determined on the basis of the operation input to the touch display 25A by the first user is the first mode or the second mode. Since the first mode and the second mode in this embodiment are the same as the first mode and the second mode in the above-described embodiment, the description thereof will not be repeated.

In a case in which the processor 22A determines that the current mode is the first mode in the first mode determination process S44 (YES), the processor 22A performs the position transmission process S45 after performing the first mode determination process S44. In a case in which the processor 22A determines that the current mode is the second mode (NO), the processor 22A returns the control process S40 to the first lens control device position specification process S42 after performing the first mode determination process S44.

(Position Transmission Process)

The position transmission process S45 is a process of transmitting the position of the lens 10 to the second lens control device 20B. In the position transmission process S45, the processor 22A transmits the coordinates of the lens 10 in the first coordinate system, which has been specified in the first specification process S43, to the processor 22B of the second lens control device 20B through the communication interfaces 21A and 21B.

After performing the position transmission process S45, the processor 22A returns the control process S40 to the first lens control device position specification process S42.

(Control Process of Second Lens Control Device)

Figure 10:
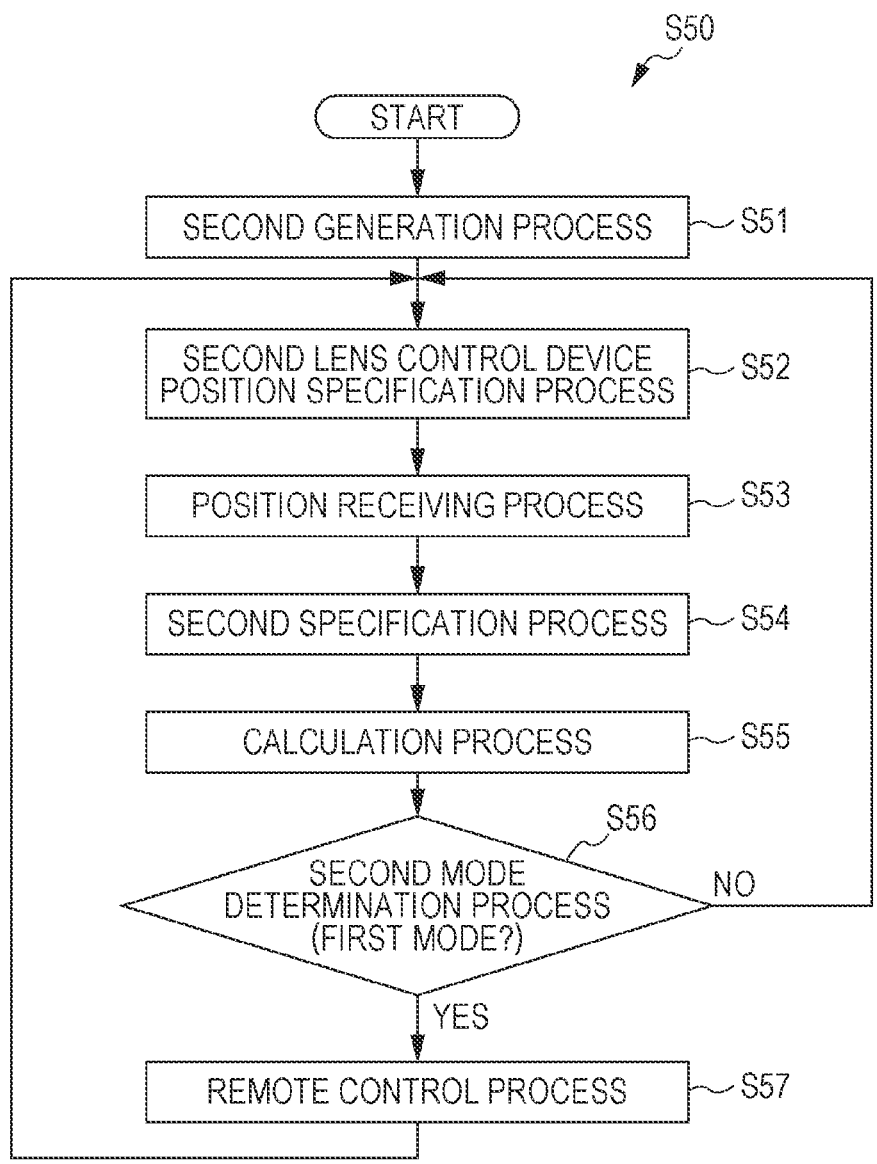
FIG. 10 is a flowchart illustrating a flow of a control process performed by a processor of a second lens control device illustrated in FIG. 8.

The control process S50 of the second lens control device 20B will be described with reference to FIG. 10. FIG. 10 is a flowchart illustrating a flow of the control process S50 performed by the processor 22B of the second lens control device 20B illustrated in FIG. 8. The control process S50 is a process of controlling the lens 10 in order to image the subject PS.

As illustrated in FIG. 10, the control process S50 includes a second generation process S51, a second lens control device position specification process S52, a position receiving process S53, a second specification process S54, a calculation process S55, a second mode determination process S56, and a remote control process S57. In this embodiment, these processes are mainly performed by the processor 22B of the second lens control device 20B.

The processor 22B starts the control process S50 in response to an input operation of the second user and first performs the second generation process S51. Then, after performing the second generation process S51, the processor 22B repeatedly performs the second lens control device position specification process S52, the position receiving process S53, the second specification process S54, the calculation process S55, the second mode determination process S56, and the remote control process S57.

(Second Generation Process)

The second generation process S51 is a process of generating a coordinate system. When the second user inputs an operation for causing the processor 22B to perform the second generation process S51 to the touch display 25B, the processor 22B performs the second generation process S51.

In the second generation process S51, first, the processor 22B specifies the position of a third object toward which the distance measurement sensor 26B is pointed. Then, the processor 22B specifies the position of a fourth object which is different from the third object and toward which the distance measurement sensor 26B is pointed by a change of the orientation of the second lens control device 20B by the second user. Then, the processor 22B generates the second coordinate system as the XYZ orthogonal world coordinate system. Here, the processor 22B generates the second coordinate system with reference to the specified positions of the third object and the fourth object such that the third object is located at the origin and the fourth object is aligned in the negative direction of the Z-axis. The second user operates the second lens control device 20B such that the first and second objects whose positions are specified in the first generation process S41 are the same as the third and fourth objects, respectively. Therefore, the first coordinate system generated in the first generation process S41 and the second coordinate system generated in the second generation process S51 are matched with each other.

(Second Lens Control Device Position Specification Process)

The second lens control device position specification process S52 is a process of specifying the position and attitude of the second lens control device 20B before the position receiving process S53. Since the second lens control device position specification process S52 is the same as the lens control device position specification process S23, the description thereof will not be repeated.

(Position Receiving Process)

The position receiving process S53 is a process of receiving the coordinates of the lens 10 in the first coordinate system which has been transmitted by the processor 22A in the position transmission process S45. Here, since the first coordinate system and the second coordinate system are matched with each other, the coordinates of the lens 10 in the first coordinate system are the same as the coordinates of the lens 10 in the second coordinate system. The processor 22B receives the coordinates of the lens 10 in the first coordinate system and stores the received coordinates of the lens 10 as the coordinates of the lens 10 in the second coordinate system in the memory 23B. In this embodiment, the specification of the position of the lens 10 is accomplished by receiving the coordinates of the lens 10 in the first coordinate system from the processor 22A.

In a case in which the mode of the first lens control device 20A is the second mode and the processor 22A does not perform the position transmission process S45, the processor 22B does not wait for the reception of the coordinates of the lens 10 and skips the position receiving process S53.

(Second Specification Process)

The second specification process S54 is a process of specifying the position of the subject PS. Since the second specification process S54 is the same as the second specification process S24, the description thereof will not be repeated.

(Calculation Process)

The calculation process S55 is a process of calculating the distance between the lens 10 and the subject PS on the basis of the position of the lens 10 and the position of the subject PS. Since the calculation process S55 is the same as the calculation process S25, the description thereof will not be repeated.

In addition, in a case in which the mode of the first lens control device 20A is the second mode and the processor 22B has not received the coordinates of the lens 10 in the position receiving process S53, the processor 22B performs the calculation process S55 with reference to the coordinates of the lens 10 which has been received by the processor 22B and stored in the memory 23B immediately before the mode of the first lens control device 20A is switched from the first mode to the second mode.

(Second Mode Determination Process)

The second mode determination process S56 is a process of determining whether the current mode of the second lens control device 20B determined on the basis of the operation input to the touch display 25B by the second user is the first mode or the second mode. Since the first mode and the second mode in this embodiment are the same as the first mode and the second mode in the above-described embodiment, the description thereof will not be repeated.

In a case in which the processor 22B determines that the current mode is the first mode in the second mode determination process S56 (YES), the processor 22B performs the remote control process S57 after performing the second mode determination process S56. In a case in which the processor 22B determines that the current mode is the second mode (NO), the processor 22B returns the control process S50 to the second lens control device position specification process S52 after performing the second mode determination process S56.

(Remote Control Process)

The remote control process S57 is a process of remotely controlling the lens 10 on the basis of the distance between the lens 10 and the subject PS calculated in the calculation process S55. Since the remote control process S57 is the same as the remote control process S27, the description thereof will not be repeated.

(Control Process of Lens)

Since the control process S10 of the lens 10 in this embodiment is the same as the control process S10 of the lens 10 in the above-described embodiment, the description thereof will not be repeated.

(Outline of Control Process of Lens Control Device)

An outline of the control process S40 of the first lens control device 20A and the control process S50 of the second lens control device 20B will be described with reference to FIG. 11. FIG. 11 is a conceptual diagram illustrating the outline of the control processes performed by the processors 22A and 22B of the first lens control device 20A and the second lens control device 20B illustrated in FIG. 8. In FIG. 11, the lens 10, the first lens control device 20A, the second lens control device 20B, and the subject PS are illustrated. The first user and the second user who hold the first lens control device 20A and the second lens control device 20B, respectively, are not illustrated for simplicity.

First, an outline of operations performed by the first user and the second user for the control process S40 and the control process S50 will be described. As illustrated in FIGS. 11(A) and 11(B), the first user keeps pointing the camera 24A of the first lens control device 20A toward the lens 10 during the first specification process S43 and the position transmission process S45. Further, as illustrated in FIGS. 11(C) to 11(E), during the second specification process S54, the calculation process S55, and the remote control process S57, the second user keeps pointing the camera 24B of the second lens control device 20B toward the subject PS.

An outline of a process performed by the first lens control device 20A in the control process S40 will be described. As illustrated in FIG. 11(A), in the first specification process S43, the first lens control device 20A detects an object, toward which the camera 24A and the distance measurement sensor 26A are pointed, as the lens 10 and specifies the coordinates of the lens 10 in the first coordinate system. Then, as illustrated in FIG. 11(B), the first lens control device 20A transmits the coordinates of the lens 10 converted into the coordinates in the first coordinate system to the second lens control device 20B.

An outline of a process performed by the second lens control device 20B in the control process S50 will be described. In the position receiving process S53, the second lens control device 20B receives the coordinates of the lens 10 from the first lens control device 20A and specifies the position of the lens 10. Then, as illustrated in FIG. 11(C), in the second specification process S54, the second lens control device 20B detects an object, toward which the camera 24B and the distance measurement sensor 26B are pointed, as the subject PS and specifies the position of the subject PS. As illustrated in FIG. 11(D), in the calculation process S55, the second lens control device 20B calculates the distance between the lens 10 and the subject PS. As illustrated in FIG. 11(E), in the remote control process S57, the second lens control device 20B transmits a command signal to the lens 10 to remotely control the lens 10 on the basis of the calculated distance.

As described above, in this embodiment, the first user keeps pointing the camera 24A toward the object intended as the lens 10, and the second user keeps pointing the camera 24B toward the object intended as the subject PS, which makes it possible for the lens system 400 to control the lens 10 in order to image the subject PS. Therefore, in this embodiment, even in a case in which both the lens 10 and the subject PS move, the lens 10 can be focused on the subject PS.

(GUIs of First Lens Control Device and Second Lens Control Device.

Figure 12A:
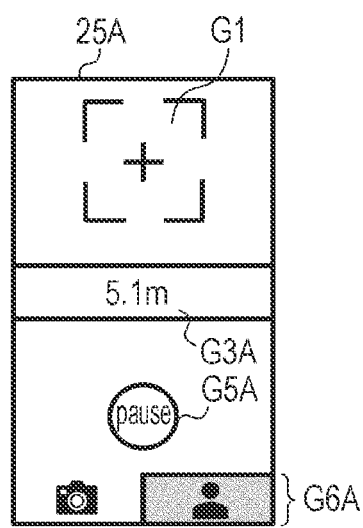
FIGS. 12A to 12C are schematic diagrams illustrating an example of GUIs displayed on touch displays of the first lens control device and the second lens control device illustrated in FIG. 8.
Figure 12B:
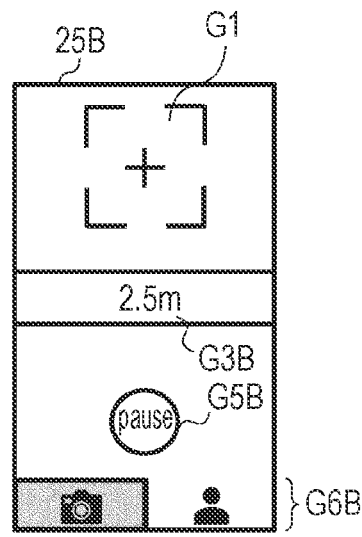
Figure 12C:
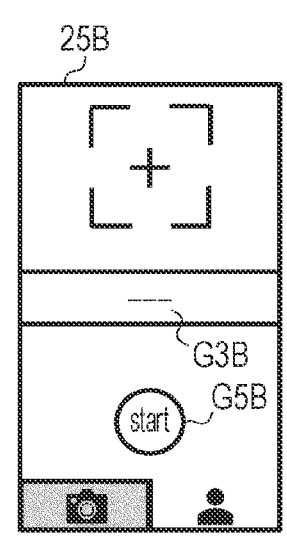

GUIs displayed on the touch display 25A while the control process S40 of the first lens control device 20A is being performed and GUIs displayed on the touch display 25B while the control process S50 of the second lens control device 20B is being performed will be described with reference to FIGS. 12A to 12C. FIGS. 12A to 12C are schematic diagrams illustrating an example of the GUIs displayed on the touch display 25A and the touch display 25B of the first lens control device 20A and the second lens control device 20B illustrated in FIG. 8. FIG. 12A illustrates the GUIs displayed on the touch display 25A of the first lens control device 20A. FIG. 12B illustrates the GUIs displayed on the touch display 25B of the second lens control device 20B in a case in which the current mode is the first mode. FIG. 12C illustrates the GUIs displayed on the touch display 25B of the second lens control device 20B in a case in which the current mode is the second mode. The touch displays 25A and 25B display the images captured by the cameras 24A and 24B as live views in the backgrounds of the GUIs. However, the illustration of the background is omitted in FIGS. 12A to 12C for simplicity.

As illustrated in FIG. 12A, the touch display 25A displays a reticle G1, lens distance information G3A, a mode switching button G5A, and a function exchange button G6A. The reticle G1 is a GUI that enables the first user to identify the object toward which the distance measurement sensor 26A is pointed. The lens distance information G3A is a GUI that displays information indicating the distance between the lens 10 and the first lens control device 20A. The mode switching button G5A is a GUI that is touched by the first user to switch the mode. The function exchange button G6A is a GUI that enables the first user to recognize whether the device held by the first user functions as the first lens control device 20A or the second lens control device 20B and that is touched by the user to exchange the functions of the first lens control device 20A with the functions of the second lens control device 20B. In FIG. 12A, the function exchange button G6A shows the first user that the device held by the first user functions as the first lens control device 20A. In addition, the first user can touch the function exchange button G6A to exchange the functions of the device held by the first user with the functions of the device held by the second user and to make the device function as the second lens control device 20B.

As illustrated in FIG. 12B, in a case in which the current mode is the first mode, the touch display 25B displays the reticle G1, calculated distance information G3B, a mode switching button G5B, and a function exchange button G6B. The reticle G1 is a GUI that enables the second user to identify the object toward which the distance measurement sensor 26B is pointed. The calculated distance information G3B is a GUI that displays information indicating the distance between the lens 10 and the subject PS calculated in the calculation process S55. The mode switching button G5B is a GUI that is touched by the second user to switch the mode. The function exchange button G6B is a GUI that enables the second user to recognize whether the device held by the second user functions as the first lens control device 20A or the second lens control device 20B and that is touched by the user to exchange the functions of the second lens control device 20B with the functions of the first lens control device 20A.

As illustrated in FIG. 12C, in a case in which the current mode is the second mode, the touch display 25B displays the calculated distance information G3B and the mode switching button G5B.

Fourth Embodiment

Hereinafter, Fourth Embodiment, which is yet another embodiment of the present invention, will be described.
(Lens System)

Figure 13:
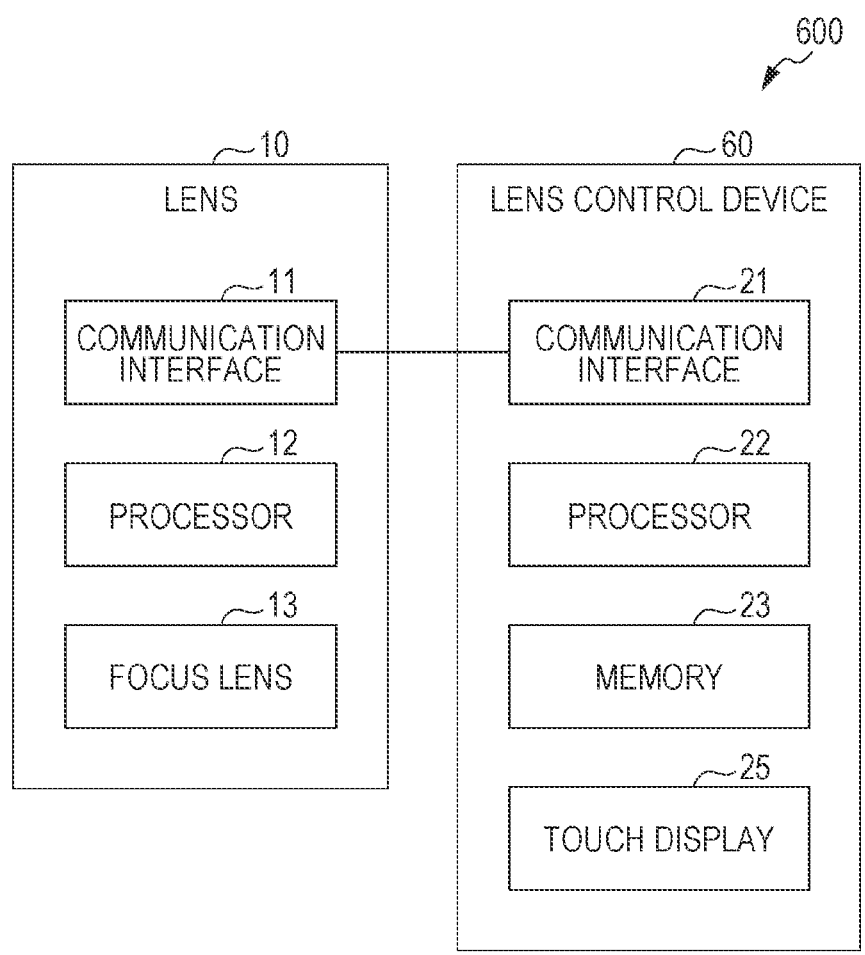
FIG. 13 is a block diagram illustrating a configuration of a lens system according to Fourth Embodiment of the present invention.

A configuration of a lens system 600 according to Fourth Embodiment of the present invention will be described with reference to FIG. 13. FIG. 13 is a block diagram illustrating the configuration of the lens system 600 according to Fourth Embodiment of the present invention.

As illustrated in FIG. 13, the lens system 600 includes the lens 10 and a lens control device 60. The lens 10 and the lens control device 60 are connected such that they can communicate with each other through a communication means. In this embodiment, each of the lens 10 and the subject PS are placed outdoors at fixed points, and the lens control device 60 is placed indoors.
(Lens Control Device)

The lens control device 60 is separated from the lens 10 and includes a communication interface 21, a processor 22, a memory 23, and a touch display 25. In this embodiment, a general-purpose personal computer is used as the lens control device 60. Each member included in the lens control device 60 has the same functions as each member that is included in the lens control device 20 and described with the same member name. Therefore, the description of each member included in the lens control device 60 will not be repeated. Further, in this embodiment, the lens control device 60 is not limited to the general-purpose personal computer. In the present invention, the lens control device 60 may be any device including at least one processor that performs a calculation process and a remote control process which will be described below. Furthermore, in this embodiment, a Wifi (registered trademark) interface is used as the communication interface 21.

(Control Process of Lens System)

A control process S600 of the lens system 600 will be described below. The control process S600 is a process of controlling the lens 10 in order to image the subject PS. In this embodiment, the control process S600 includes a control process S10 of the lens 10 and a control process S60 of the lens control device 60. The processor 22 of the lens control device 60 performs the control process S60, and the processor 12 of the lens 10 performs the control process S10 in operative association with the control process S60 to perform the control process S600. In addition, since the control process S10 of the lens 10 in this embodiment is the same as the control process S10 of the lens 10 in the above-described embodiment, the description thereof will not be repeated.

(Control Process of Lens Control Device)

Figure 14:
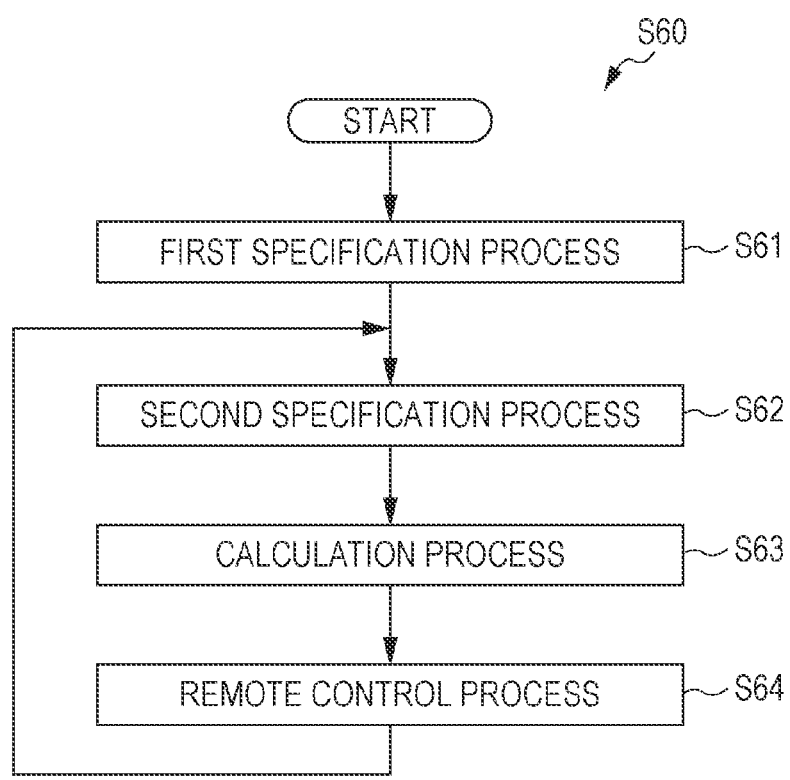
FIG. 14 is a flowchart illustrating a flow of a control process performed by a processor of a lens control device illustrated in FIG. 13.

The control process S60 of the lens control device 60 will be described with reference to FIG. 14. FIG. 14 is a flowchart illustrating a flow of the control process S60 performed by the processor 22 of the lens control device 60 illustrated in FIG. 13.

As illustrated in FIG. 14, the control process S60 includes a first specification process S61, a second specification process S62, a calculation process S63, and a remote control process S64. In this embodiment, these processes are mainly performed by the processor 22 of the lens control device 60.

(First Specification Process)

The first specification process S61 is a process of specifying the position of the lens 10. In the first specification process S61, the processor 22 displays map information on the touch display 25. The user touches the touch display 25 to input a position on a map which corresponds to the position of the lens 10, with reference to the map information displayed on the touch display 25. The processor 22 specifies the position of the lens 10 on the map with reference to the input position on the map.

(Second Specification Process)

The second specification process S62 is a process of specifying the position of the subject PS. In the second specification process S62, the processor 22 displays map information on the touch display 25. The user touches the touch display 25 to input a position on a map which corresponds to the position of the subject PS, with reference to the map information displayed on the touch display 25. The processor 22 specifies the position of the subject PS on the map with reference to the input position on the map.

In this embodiment, the position on the map which is displayed at the touch position of the user on the touch display 25 is specified as the position of the subject PS. However, the present invention is not limited thereto. For example, the touch display 25 may display a reticle at a fixed point on a screen thereof and also display map information that can be scrolled, and a position on the map which is displayed to be superimposed on the reticle may be specified as the position of the subject PS. In this case, the user scrolls the touch display 25 to superimpose the position of the subject PS on the reticle.

(Calculation Process)

The calculation process S63 is a process of calculating the distance between the lens 10 and the subject PS on the basis of the position of the lens 10 and the position of the subject PS. In the calculation process S63, the processor 22 calculates the distance between the lens 10 and the subject PS with reference to the position of the lens 10 on the map specified in the first specification process and the position of the subject PS on the map specified in the second specification process.

(Remote Control Process)

The remote control process S64 is a process of remotely controlling the lens 10 on the basis of the distance between the lens 10 and the subject PS calculated in the calculation process S63. In the remote control process S64, the processor 22 transmits information indicating the calculated distance as a command signal to the processor 12 of the lens 10 through the communication interfaces 11 and 22.

After the remote control process S64, the processor 22 returns the control process S60 to the second specification process S62 and thus repeatedly performs the second specification process S62, the calculation process S63, and the remote control process S64. A series of processes repeatedly performed is performed by the processor 22 each time the user touches the touch display 25.

Modification Examples of Fourth Embodiment

In this embodiment, the first specification process S61 is performed with reference to the position on the map which has been input by the user. However, the present invention is not limited thereto. In the present invention, the processor 12 of the lens 10 may specify the position of the lens 10 using a positioning system, and the processor 22 of the lens control device 60 may receive the specified position of the lens 10 to achieve the first specification process S61.

Further, in this embodiment, the processor 22 of the lens control device 60 performs the first specification process S61 and the second specification process S62. However, the present invention is not limited thereto. In the present invention, the processor 22 may read information indicating the position of the lens 10 and the position of the subject PS stored in the memory 23 of the lens control device 60 and perform the calculation process S63 and the remote control process S64 with reference to the read information.

(Example of Implementation by Software)

The functions of the lens control devices 20, 30 and 60, the first lens control device 20A, and the second lens control device 20B (hereinafter, referred to as "devices") can be implemented by programs that cause a computer to function as the devices and that cause a processor of the computer to function as the processors of the devices.

In this case, the device includes a computer that has at least one control device (for example, a processor) and at least one storage device (for example, a memory) as hardware for executing the program. The control device and the storage device execute the program to implement each function described in each of the above-described embodiments.

The program may be recorded on one or more non-transitory computer-readable recording media. This recording medium may or may not be included in the device. In the latter case, the program may be supplied to the device through any wired or wireless transmission medium.

(Summary)

As can be understood from the above, according to a first aspect of the present invention, there is provided a lens control device (the lens control device 20, 30, or 60, the first lens control device 20A, or the second lens control device 20B) for controlling a lens (10) in order to image a subject (PS). The lens control device includes at least one processor (22, 22A, or 22B) configured to perform a calculation process (S25, S55, or S63) of calculating a distance between the lens or a camera (C), to which the lens is attached, and the subject on the basis of a position of the lens or the camera and a position of the subject and a remote control process (S27, S57, or S64) of remotely controlling the lens on the basis of the distance.

According to a second aspect of the present invention, in the lens control device, in addition to the configuration included in the lens control device according to the first aspect, the at least one processor performs a first specification process (S22, S43, or S61) of specifying the position of the lens or the camera and then repeatedly performs a second specification process (S24, S54, or S62) of specifying the position of the subject, the calculation process, and the remote control process, the calculation process and the remote control process being performed with reference to the position of the lens or the camera specified in the first specification process and the position of the subject specified in the second specification process.

According to a third aspect of the present invention, in addition to the configuration included in the lens control device according to the second aspect, the lens control device further includes at least one sensor (the distance measurement sensor 35 and the position and attitude sensor 36). In the first specification process and the second specification process, the at least one processor refers to a position and attitude of the lens control device measured by the at least one sensor and the distance between the lens, the camera, or the subject and the lens control device. In the first specification process, the at least one processor specifies the position of the lens or the camera, using an object toward which the at least one sensor is pointed as the lens or the camera. In the second specification process, the at least one processor specifies the position of the subject, using the object toward which the at least one sensor is pointed as the subject.

According to a fourth aspect of the present invention, in addition to the configuration included in the lens control device according to the third aspect, the lens control device has a function (reticle G1) or a structure (guide 34) that enables a user to identify the object toward which the at least one sensor is pointed.

According to a fifth aspect of the present invention, in addition to the configuration included in the lens control device according to any one of the first to fourth aspects, the lens control device further includes an input unit (a touch display 25, 25A, or 25B and a button 37, 37A, or 37B). The at least one processor performs a mode determination process of determining whether a current mode determined on the basis of an operation input to the input unit by the user is a first mode in which the at least one processor performs the remote control process after the calculation process or a second mode in which the at least one processor repeats the calculation process without performing the remote control process after the calculation process.

According to a sixth aspect of the present invention, there is provided a lens system (200, 300, 400, or 600) for controlling a lens in order to image a subject. The lens system includes the lens and at least one lens control device. The at least one lens control device includes at least one processor configured to perform a calculation process of calculating a distance between the lens or a camera, to which the lens is attached, and the subject on the basis of a position of the lens or the camera and a position of the subject and a remote control process of remotely controlling the lens on the basis of the distance.

According to a seventh aspect of the present invention, in the lens system, in addition to the configuration included in the lens system according to the sixth aspect, the at least one lens control device includes a first lens control device (20A) and a second lens control device (20B) that are capable of communicating with each other. The first lens control device includes at least one processor (22A) configured to perform a first specification process of specifying the position of the lens or the camera and a position transmission process (S45) of transmitting the position of the lens or the camera to the second lens control device. The second lens control device includes at least one processor (22B) configured to repeatedly perform a second specification process of specifying the position of the subject, the calculation process, and the remote control process, the calculation process and the remote control process being performed with reference to the position of the lens or the camera received from the first lens control device and the position of the subject specified in the second specification process.

According to an eighth aspect of the present invention, there is provided a program (control processing program P20) for controlling a lens control device that controls a lens in order to image a subject. The program causes at least one processor included in the lens control device to perform a calculation process of calculating a distance between the lens or a camera, to which the lens is attached, and the subject on the basis of a position of the lens or the camera and a position of the subject and a remote control process of remotely controlling the lens on the basis of the distance.

(Supplementary Note)

The present invention is not limited to the above-described embodiments, but can be modified in various ways within the scope of the claims. Embodiments obtained by appropriately combining technical means disclosed in different embodiments are also included in the technical scope of the present invention.

What is claimed is:

1. A lens control device for controlling a lens in order to image a subject, the lens control device comprising:
   at least one processor configured to perform a calculation process of calculating a distance between the lens or a camera, to which the lens is attached, and the subject on a basis of a position of the lens or the camera and a position of the subject and a remote control process of remotely controlling the lens on a basis of the distance,
   wherein the at least one processor performs a first specification process of specifying the position of the lens or the camera and then repeatedly performs a second specification process of specifying the position of the subject, the calculation process, and the remote control process, the calculation process and the remote control process being performed with reference to the position of the lens or the camera specified in the first specification process and the position of the subject specified in the second specification process.

2. The lens control device according to claim 1,
   wherein the lens control device further includes at least one sensor,
   in the first specification process and the second specification process, the at least one processor refers to a position and attitude of the lens control device measured by the at least one sensor and a distance between the lens, the camera, or the subject and the lens control device,
   in the first specification process, the at least one processor specifies the position of the lens or the camera, using an object toward which the at least one sensor is pointed as the lens or the camera, in the second specification process, the at least one processor specifies the position of the subject, using the object toward which the at least one sensor is pointed as the subject.

3. The lens control device according to claim 2,
wherein the lens control device has a function or a structure that enables a user to identify the object toward which the at least one sensor is pointed.

4. The lens control device according to claim 1, further comprising:
an input unit,
wherein the at least one processor performs a mode determination process of determining whether a current mode determined on a basis of an operation input to the input unit by the user is a first mode in which the at least one processor performs the remote control process after the calculation process or a second mode in which the at least one processor repeats the calculation process without performing the remote control process after the calculation process.

5. A lens system for controlling a lens in order to image a subject, the lens system comprising:
the lens; and
at least one lens control device,
wherein the at least one lens control device includes at least one processor configured to perform a calculation process of calculating a distance between the lens or a camera, to which the lens is attached, and the subject on a basis of a position of the lens or the camera and a position of the subject and a remote control process of remotely controlling the lens on a basis of the distance,
wherein the at least one lens control device includes a first lens control device and a second lens control device that are capable of communicating with each other
wherein the first lens control device includes at least one processor configured to perform a first specification process of specifying the position of the lens or the camera and a position transmission process of transmitting the position of the lens or the camera to the second lens control device, and
wherein the second lens control device includes at least one processor configured to repeatedly perform a second specification process of specifying the position of the subject, the calculation process, and the remote control process, the calculation process and the remote control process being performed with reference to the position of the lens or the camera received from the first lens control device and the position of the subject specified in the second specification process.

6. A non-transitory computer-readable medium having embodied thereon a program for controlling a lens control device that controls a lens in order to image a subject, and when executed by at least one processor included in the lens control device the program causes the at least one processor to execute a method, the method comprising:
a calculation process of calculating a distance between the lens or a camera, to which the lens is attached, and the subject on a basis of a position of the lens or the camera and a position of the subject; and
a remote control process of remotely controlling the lens on a basis of the distance,
wherein the at least one processor performs a first specification process of specifying the position of the lens or the camera and then repeatedly performs a second specification process of specifying the position of the subject, the calculation process, and the remote control process, the calculation process and the remote control process being performed with reference to the position of the lens or the camera specified in the first specification process and the position of the subject specified in the second specification process.

* * * * *